United States Patent [19]
Kamikado et al.

[11] Patent Number: 5,845,974
[45] Date of Patent: Dec. 8, 1998

[54] ANTI-SKID CONTROL SYSTEM FOR AN AUTOMOTIVE VEHICLE

[75] Inventors: Masaru Kamikado, Anjo; Tadashi Terazawa, Toyota; Hiroyuki Ichikawa, Okazaki; Yasuhiro Abe, Toyota, all of Japan

[73] Assignee: Aisin Seiki Kabushiki Kaisha, Kariya, Japan

[21] Appl. No.: 523,937

[22] Filed: Sep. 6, 1995

[30] Foreign Application Priority Data

Sep. 9, 1994 [JP] Japan ................................. 6-242198

[51] Int. Cl.⁶ .................................................. B60T 8/32
[52] U.S. Cl. ...................................... 303/115.2; 303/116.1
[58] Field of Search ............................ 303/115.1–115.5, 303/116.1, 116.2, 119.1

[56] References Cited

U.S. PATENT DOCUMENTS

| | | | |
|---|---|---|---|
| 5,348,380 | 9/1994 | Korasiak et al. | |
| 5,368,374 | 11/1994 | Fujimoto | 303/116.1 |
| 5,501,514 | 3/1996 | Resch et al. | 303/115.4 |
| 5,522,650 | 6/1996 | Negrin et al. | 303/116.1 |
| 5,531,514 | 7/1996 | Nishii et al. | 303/116.1 |
| 5,540,488 | 7/1996 | Terazawa et al. | 303/119.1 |
| 5,549,366 | 8/1996 | Toda et al. | 303/113.2 |
| 5,620,238 | 4/1997 | Takeuchi | 303/116.1 |
| 5,655,819 | 8/1997 | Emig et al. | 303/119.1 |
| 5,683,149 | 11/1997 | Aizawa et al. | 303/116.1 |
| 5,700,069 | 12/1997 | Yokoyawa et al. | 303/115.2 |

FOREIGN PATENT DOCUMENTS

| | | |
|---|---|---|
| 4010841 | 10/1991 | Germany . |
| 4012167 | 10/1991 | Germany . |
| 4030724 | 4/1992 | Germany . |
| 3542689 | 6/1993 | Germany . |
| 4223602 | 1/1994 | Germany . |
| 19519236 | 12/1995 | Germany . |
| 62-134361 | of 1987 | Japan . |
| 2242717 | 9/1990 | United Kingdom . |

*Primary Examiner*—Robert J. Oberleitner
*Assistant Examiner*—Chris Schwartz
*Attorney, Agent, or Firm*—Sughrue, Mion, Zinn, Macpeak & Seas, PLLC

[57] ABSTRACT

The present invention is directed to an anti-skid control system which includes a return passage provided for communicating a wheel brake cylinder with an actuator. A pressure pump is disposed in the return passage, and a reservoir is disposed in the return passage at the inlet port's side of the pump. The reservoir stores the brake fluid in the wheel brake cylinder through the actuator to decrease the wheel cylinder pressure. The pump discharges the brake fluid stored in the reservoir into the return passage thereby to gradually increase the wheel cylinder pressure. The amount of brake fluid stored in the reservoir is estimated on the basis of the amount of brake fluid fed into the reservoir and the amount of brake fluid discharged therefrom. The amount of brake fluid fed into the reservoir is estimated on the basis of the wheel cylinder pressure provided when the pressure decreasing operation starts, and in response to the pressure decreasing time. The amount of brake fluid discharged from the reservoir is estimated on the basis of the wheel cylinder pressure set when the gradual pressure increasing operation starts, and in response to the gradual pressure increasing time.

10 Claims, 16 Drawing Sheets

5,845,974

ANTI-SKID CONTROL SYSTEM FOR AN AUTOMOTIVE VEHICLE

BACKGROUND OF THE INVENTION

1. Field of the Invention

The present invention relates to an anti-skid control system for controlling the braking force applied to road wheels in a braking operation of an automotive vehicle to prevent the road wheels from being locked, and more particularly to an anti-skid control system which has a reservoir and a pressure pump disposed in a return passage for bypassing a pressure control apparatus, and wherein a pressure in a wheel brake cylinder is decreased by discharging the brake fluid therein into the reservoir, and the pressure is gradually increased by the pressure pump which returns the brake fluid into the wheel brake cylinder.

2. Description of the Prior Art

Various anti-skid control systems are known, including a system which is disclosed in Japanese Patent Laid-open publication No.62-134361, and in which a pressure in a wheel brake cylinder is decreased by discharging the brake fluid therein into a reservoir, and the brake fluid stored in the reservoir is returned to the wheel brake cylinder by a pressure pump. According to this publication, a return passage is connected to a hydraulic brake circuit between a braking pressure modulator and a wheel brake (i.e., wheel brake cylinder), thereby to reduce an impact applied to the brake pedal.

According to the above-identified Japanese publication No.62-134361, it is described that a controller 10 changes a braking pressure modulating valve 4 to be placed into a normal braking position for generating the braking pressure, when the locking of the wheel has not been caused for a predetermined period of time after a return pump 9 was activated so as to return the brake fluid from a tank 8 (i.e., reservoir) to the wheel brake cylinders 6, 7. However, the predetermined period of time in determining when the valve is to be placed in the normal braking position has not been clarified. For example, if the predetermined time for activating the return pump so as to return the brake fluid from the reservoir to the wheel brake cylinder is short, the reservoir will be immediately fulfilled with the brake fluid, as shown in the middle of FIG. 22 of the publication, so that a space for decreasing the braking pressure will be lost at a point Tf thereby to cause the wheel to be locked as in the bottom of FIG. 22. On the contrary, if the predetermined time is too long, the brake fluid in the reservoir will be lost at a point Te as shown in the bottom of FIG. 23, so that the pressure in the wheel brake cylinder can not be increased sufficiently. Therefore, it is necessary to monitor the amount of brake fluid in the reservoir, but it will not meet the requirement of decrease in cost, if a sensor is provided for detecting the amount of brake fluid in the reservoir. For example, a flow meter may be installed in the reservoir for monitoring a change in the amount of brake fluid stored in the reservoir, so that the brake fluid can be introduced from a hydraulic pressure generator, such as a master cylinder or the like, into the reservoir, when the reservoir has become empty. However, the flow meter is too expensive to meet the requirement of decrease in cost. In addition, when the brake fluid in the reservoir is lost, it is necessary to supply the brake fluid, from the hydraulic pressure generator for example, directly to the wheel brake cylinder so as to maintain a predetermined braking force. In this case, however, as far as a space for decreasing the pressure in the wheel brake cylinder is ensured in the reservoir, it may be so constituted that the brake fluid is supplied from the hydraulic pressure generator directly to the wheel brake cylinder, before the brake fluid in the reservoir is lost, so that the pressure in the wheel brake cylinder will be rapidly increased.

SUMMARY OF THE INVENTION

Accordingly, it is an object of the present invention to provide an anti-skid control system wherein the brake fluid in a wheel brake cylinder is discharged into a reservoir to decrease the pressure in the wheel brake cylinder, and the brake fluid in the reservoir is returned by a pressure pump to the wheel brake cylinder, and which includes inexpensive means for estimating the amount of brake fluid.

It is another object of the present invention to provide an anti-skid control system wherein the amount of brake fluid in a reservoir is properly estimated, and wherein the brake fluid is supplied from a hydraulic pressure generator directly to a wheel brake cylinder, when the brake fluid in the reservoir becomes approximately zero, so as to maintain a predetermined braking force.

It is a further object of the present invention to provide an anti-skid control system wherein the amount of brake fluid in a reservoir is properly estimated, and wherein the brake fluid is supplied from a hydraulic pressure generator directly to a wheel brake cylinder, with a space for storing the brake fluid in a reservoir ensured for the pressure decreasing operation.

In accomplishing the above and other objects, an anti-skid control system for controlling a braking force applied to road wheels of an automotive vehicle comprises a wheel brake cylinder operatively connected to a road wheel of the vehicle for applying braking force thereto, a hydraulic pressure generator for supplying a hydraulic braking pressure to the wheel brake cylinder, actuating means which is disposed between the hydraulic pressure generator and the wheel brake cylinder for controlling the hydraulic braking pressure in the wheel brake cylinder. A reservoir is communicated with the actuating means. This reservoir has a capacity for storing a predetermined amount of brake fluid, and stores the brake fluid in the wheel brake cylinder through the actuating means to decrease the pressure in the wheel brake cylinder. A return passage is provided for communicating the reservoir with the wheel brake cylinder. And, a pressure pump is disposed in the return passage. The pressure pump has an inlet port communicated with the reservoir and an outlet port communicated with the wheel brake cylinder for discharging a pressurized brake fluid thereto. It is so arranged that the actuating means blocks the communication between the hydraulic pressure generator and the wheel brake cylinder, and then the pressure pump discharges the brake fluid which is stored in the reservoir into the return passage thereby to gradually increase the pressure in the wheel brake cylinder. Pressure decreasing time measuring means is provided for measuring a time for decreasing the pressure in the wheel brake cylinder by the actuating means, and gradual pressure increasing time measuring means is provided for measuring a time for gradually increasing the pressure in the wheel brake cylinder by the actuating means and the pressure pump. Pressure setting means is provided for initially setting the pressure in the wheel brake cylinder provided when the actuating means starts decreasing the pressure in the wheel brake cylinder, and provided for resetting the pressure in accordance with the pressure decreasing time. Then, reservoir fluid estimating means is provided for estimating the amount of brake fluid which is stored in the reservoir, on the basis of the amount of brake fluid which is fed into the reservoir and the amount of brake fluid which is discharged from the reservoir. The reservoir fluid estimating means estimates the amount of brake fluid which is fed into the reservoir on the basis of the pressure in the wheel brake cylinder when the pressure decreasing operation starts, and in response to the pressure decreasing time thereafter, and estimates the amount of brake fluid which is discharged from the reservoir on the basis of the pressure in the wheel brake cylinder which is set by the pressure setting means when the gradual pressure increasing operation starts, and in response to the gradual pressure increasing time thereafter.

The above-described anti-skid control system as described above may further include first pressure increase allowing means for controlling the actuating means so as to allow the hydraulic pressure generator to communicate with the wheel brake cylinder, when the reservoir fluid estimating means estimates the amount of brake fluid stored in the reservoir to be approximately zero.

The anti-skid control system as described above may further include wheel's side fluid estimating means for estimating the amount of brake fluid fed from the hydraulic pressure generator to a hydraulic circuit at the wheel's side including the wheel brake cylinder, and second pressure increase allowing means for controlling the actuating means so as to allow the hydraulic pressure generator to communicate with the wheel brake cylinder, when the amount of brake fluid estimated by the wheel's side fluid estimating means is smaller than the capacity of the reservoir.

In the anti-skid control system as described above, the wheel's side fluid estimating means may include output pressure detection means for detecting a braking pressure output from the hydraulic pressure generator, and the wheel's side fluid estimating means is preferably provided for estimating the amount of brake fluid fed to the hydraulic circuit at the wheel's side on the basis of the difference between the pressure output from the hydraulic pressure generator detected by the output pressure detection means and the pressure in the wheel brake cylinder set by the pressure setting means.

In the anti-skid control systems as described above, the actuating means may include a three-port two-position changeover valve which has a first port connected to the hydraulic pressure generator, and a second port connected to an end of the return passage, and a two-port two-position changeover valve which has a first port connected to a third port of the three-port two-position changeover valve, and a second port connected to the wheel brake cylinder.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
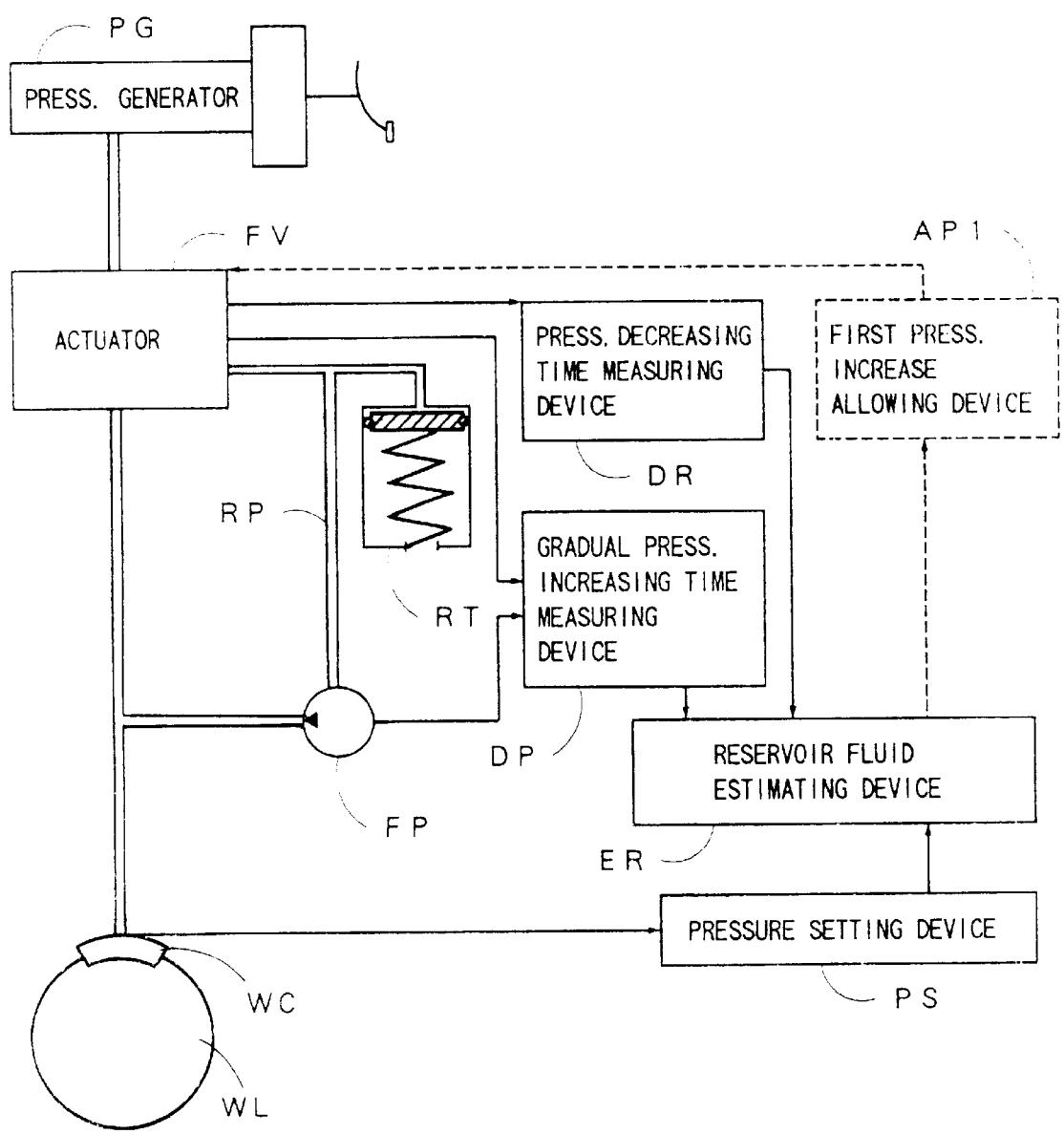
FIG. 1 is a general block diagram illustrating an anti-skid control system according to the present invention.

Referring to FIG. 1, there is schematically illustrated an anti-skid control system according to the present invention, which controls a braking force applied to a road wheel WL of a vehicle depending upon a braking condition. In this anti-skid control system, it is so arranged that when the hydraulic pressure generator PG is operated, a hydraulic braking pressure is supplied from the pressure generator PG to a wheel brake cylinder WC through an actuator FV, so that a braking force is applied to the road wheel WL. A reservoir RT is communicated with the actuator FV. This reservoir RT has a capacity for storing a predetermined amount of brake fluid, and stores the brake fluid in the wheel brake cylinder WC through the actuator FV to decrease the pressure in the wheel brake cylinder WC. A return passage RP is provided for communicating the reservoir RT with the wheel brake cylinder WC. And, a pressure pump FP is disposed in the return passage RP such that its inlet port is communicated with the reservoir RT, and that its outlet port is communicated with the wheel brake cylinder WC for discharging a pressurized brake fluid thereto. It is so arranged that the actuator FV blocks the communication between the hydraulic pressure generator PG and the wheel brake cylinder WC, and then the pressure pump FP discharges the brake fluid which is stored in the reservoir RT into the return passage RP thereby to gradually increase the pressure in the wheel brake cylinder WC. A pressure decreasing time measuring device DR is arranged to measure a time for decreasing the pressure in the wheel brake cylinder WC by the actuator FV, and a gradual pressure increasing time measuring device DP is arranged to measure a time for gradually increasing the pressure in the wheel brake cylinder WC by the actuator FV and the pressure pump FP. A pressure setting device PS is arranged to initially set the pressure in the wheel brake cylinder WC which is provided when the actuator FV starts decreasing the pressure in the wheel brake cylinder WC, and arranged to reset the pressure in accordance with the pressure decreasing time. And, a reservoir fluid estimating device ER is arranged to estimate the amount of brake fluid which is stored in the reservoir RT, on the basis of the amount of brake fluid which is fed into the reservoir RT and the amount of brake fluid which is discharged from the reservoir RT. The reservoir fluid estimating device ER estimates the amount of brake fluid which is fed into the reservoir RT on the basis of the pressure in the wheel brake cylinder when the pressure decreasing operation starts, and in response to the pressure decreasing time thereafter, and estimates the amount of brake fluid which is discharged from the reservoir RT on the basis of the pressure in the wheel brake cylinder WC which is set by the pressure setting device PS when the gradual pressure increasing operation starts, and in response to the gradual pressure increasing time thereafter. As indicated by a phantom line in FIG. 1, a first pressure increase allowing device AP1 may be provided for controlling the actuator FV so as to allow the hydraulic pressure generator PG to communicate with the wheel brake cylinder WC, when the reservoir fluid estimating device ER estimates the amount of brake fluid stored in the reservoir RT to be approximately zero.

Figure 2:
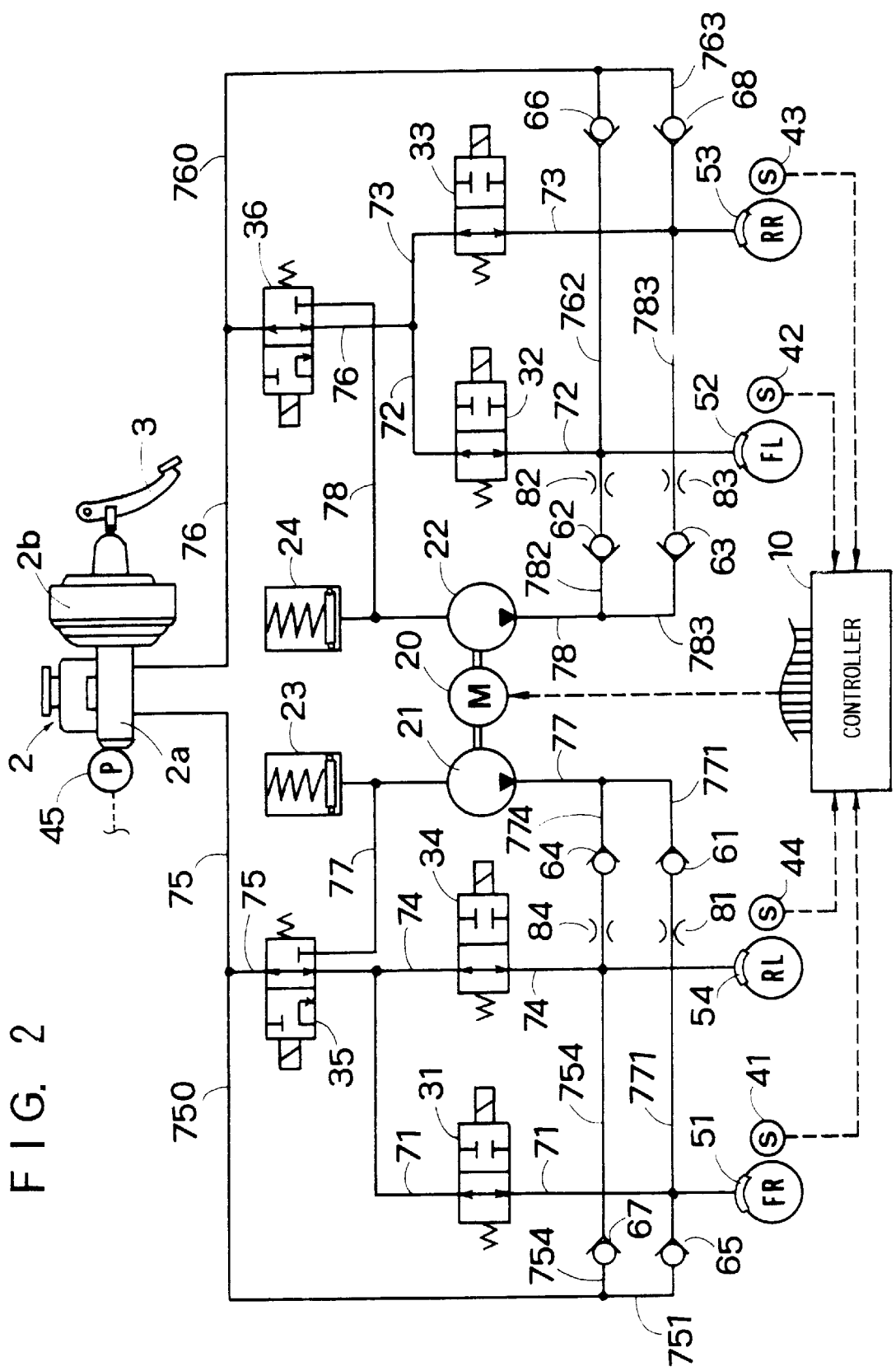
FIG. 2 is a schematic block diagram of an anti-skid control system of an embodiment of the present invention.

More specifically, an embodiment of the present invention is illustrated in FIGS. 2 to 6. Referring to FIG. 2, a hydraulic pressure generator 2 comprises a master cylinder 2a and a booster 2b operated in response to a depression of a brake pedal 3. Two-port two-position solenoid operated changeover valves 31 to 34 (hereinafter, simply referred to as solenoid valves 31 to 34) are disposed in the passages 71 to 74, which are respectively connected to wheel brake cylinders 51 to 54 which are operatively connected to the road wheels FR, FL, RR and RL, respectively. A pair of three-port two-position solenoid operated changeover valves 35, 36 (hereinafter, simply referred to as solenoid valves 35, 36) are disposed in the passages 75, 76 which connect the passages 71, 74 and the passages 72, 73 to the master cylinder 2a, respectively. The road wheel FR designates a road wheel at the fore right side as viewed from the position of a driver's seat, the road wheel FL designates a road wheel at the fore left side, the road wheel RR designates a road wheel at the rear right side, and the road wheel RL designates a road wheel at the rear left side. In the present embodiment, a diagonal hydraulic dual circuits system has been formed as shown in FIG. 2.

The valve 35 provided for the road wheels FR, RL has a port which is connected to the passage 71 disposed between the solenoid valve 31 and the wheel brake cylinder 51, through return passages 77 and 771, and connected to the passage 74 disposed between the solenoid valve 34 and the wheel brake cylinder 54, through return passages 77 and 774. In the return passage 77, there is disposed a pressure pump 21, an inlet port of which is connected to a reservoir 23. In the return passages 771, 774, there are disposed check valves 61, 64 for preventing the brake fluid from flowing into the pump 21, and orifices 81, 84 are disposed at the sides of the wheel brake cylinders 51, 54 with respect to the check valves 61, 64. Passages 750, 751, 754 are provided for connecting a position between the master cylinder 2a and the solenoid valve 35 to positions between the solenoid valves 31, 34 and the wheel brake cylinders 51, 54. In the passages 751, 754, there are disposed check valves 65, 67 for preventing the brake fluid from flowing into the wheel brake cylinders 51, 54.

The system for the road wheels FL, RR is constituted in the same manner as that described above. That is, the valve 36 provided for the road wheels FL, RR has a port which is connected to the passage 72 disposed between the solenoid valve 32 and the wheel brake cylinder 52, through return passages 78 and 782, and connected to the passage 73 disposed between the solenoid valve 33 and the wheel brake cylinder 53, through return passages 78 and 783. In the return passage 78, there is disposed a pressure pump 22, an inlet port of which is connected to a reservoir 24. In the return passages 782, 783, there are disposed check valves 62, 63 for preventing the brake fluid from flowing into the pump 22, and orifices 82, 83 are disposed at the sides of the wheel brake cylinders 52, 53 with respect to the check valves 62, 63. Passages 760, 762, 763 are provided for connecting a position between the master cylinder 2a and the solenoid valve 36 to positions between the solenoid valves 32, 33 and the wheel brake cylinders 52, 53. In the passages 762, 763, there are disposed check valves 66, 68 for preventing the brake fluid from flowing into the wheel brake cylinders 52, 53.

The pumps 21, 22 are driven by an electric motor 20 continuously during the anti-skid control operation, so that the brake fluid of the amount proportional to the rotational speed of the electric motor 20 is fed to each of the wheel brake cylinders 51 to 54. Each of the reservoirs 23, 24 is provided with a piston and a spring, and functions so as to store the brake fluid returned from each of the solenoid valves 35, 36 through the return passages 77, 78, so that the brake fluid is pumped up by the pumps 21, 22 and supplied to the wheel brake cylinders 51 to 54 when the solenoid valves 31 to 34 are closed, while the brake fluid is returned to the reservoirs 23, 24 when the solenoid valves 31 to 34 are open. The aforementioned check valve 61 and orifice 81, and the check valve 64 and orifice 84 are provided for dividing the brake fluid discharged from the pump 21 to flow into the wheel brake cylinders 51, 54, respectively. The check valve 62 and orifice 82, and the check valve 63 and orifice 83 are provided for dividing the brake fluid discharged from the pump 22 to flow into the wheel brake cylinders 52, 53, respectively.

Each of the solenoid valves 31 to 34 is in its first operating position as shown in FIG. 2 when a current is not fed to its solenoid coil, so that each of the wheel brake cylinders 51 to 54 is communicated with the hydraulic pressure generator 2 through the solenoid valves 35, 36 in their first operating positions. When the current is fed to each solenoid coil of the solenoid valves 31 to 34, each solenoid valve is changed over to its second operating position, so that each of the wheel brake cylinders 51 to 54 is blocked from the communication with the hydraulic pressure generator 2. Whereas, each of the solenoid valves 35, 36 is placed in its first operating position as shown in FIG. 2 when the current is not fed to its solenoid coil, so that the hydraulic pressure generator 2 is communicated with the solenoid valves 31 to 34 and the return passages 77, 78 are shut off. When the current is fed to each solenoid coil of the solenoid valves 35, 36, each solenoid valve is changed over to its second operating position, so that the solenoid valves 31 to 34 are blocked from the communication with the hydraulic pressure generator 2, but communicated with the reservoirs 23, 24 and the pumps 21, 22. The check valves 65 to 68 as shown in FIG. 2 allow the brake fluid to return from each of the wheel brake cylinders 51 to 54 to the hydraulic pressure generator 2, and blocks the counterflow of the brake fluid.

Accordingly, during the anti-skid control operation wherein the pumps 21, 22 are continuously driven, with each of the solenoid valves 31 to 36 energized or de-energized, the hydraulic braking pressure in each of the wheel brake cylinders 51 to 54 is rapidly increased, gradually increased or decreased. Namely, when the current is not fed to the solenoid coil of each of the solenoid valves 31 to 36, the pressurized brake fluid is supplied from the hydraulic pressure generator 2 directly to the wheel brake cylinders 51 to 54 to increase the hydraulic pressure therein rapidly. When the current is fed to each solenoid coil of the solenoid valves 35 and 36 (with the solenoid valves 31 to 34 de-energized), the wheel brake cylinders 51 to 54 are blocked from the communication with the hydraulic pressure generator 2, but communicated with the reservoir 23 or 24 to decrease the hydraulic pressure therein. When the current is fed to all the solenoid coils of the solenoid valves 31 to 36, the brake fluid in the reservoirs 23, 24 is pumped up by the pumps 21, 22 to be supplied to the wheel brake cylinders 51 to 54 through the check valves 61 to 64 and the orifices 81 to 84. The amount of brake fluid supplied by the pumps 21, 22 to the wheel brake cylinders 51 to 54 has been set to the amount much smaller than the amount of brake fluid supplied from the master cylinder 2a to the wheel brake cylinders 51 to 54, so that the hydraulic pressure in each of the wheel brake cylinders 51 to 54 is gradually increased. Furthermore, by adjusting the time intervals of energization and de-energization of the solenoid valves 31 to 34, with the solenoid valves 35, 36 energized, it is possible to substantially hold the hydraulic braking pressure in the wheel brake cylinders 51 to 54. Or, if the electric motor 20 is turned off when the solenoid valves 31 to 34 are energized, the hydraulic pressure in the wheel brake cylinders 51 to 54 can be held. In the present embodiment, however, the hold mode has not been provided, because the control of the electric motor 20 is likely to be complicated.

The above-described solenoid valves 31 to 36 are electrically connected to the electronic controller 10 which controls the operation of the solenoid valves 31 to 36. The electric motor 20 is also connected to the electronic controller 10, so that the operation of the electric motor 20 is controlled by the electronic controller 10. At the road wheels FR, FL, RR and RL, there are provided wheel speed sensors 41 to 44 respectively, which are connected to the electronic controller 10, and by which a signal corresponding to a rotational speed of each road wheel, i.e., a wheel speed signal is fed to the electronic controller 10. Each of the wheel speed sensors 41 to 44 in the present embodiment is a well known sensor of electromagnetic induction type which comprises a pick-up having a coil wound around a permanent magnet and a rotor having an outer peripheral end thereof provided with teeth, and functions to output a voltage with a frequency proportional to the rotational speed of each road wheel, while other types of sensor may be used, instead of the above-described sensor. There is also provided a pressure sensor 45 which detects a pressure of the brake fluid discharged from the master cylinder 2a, and outputs a signal to the electronic controller 10.

Figure 3:
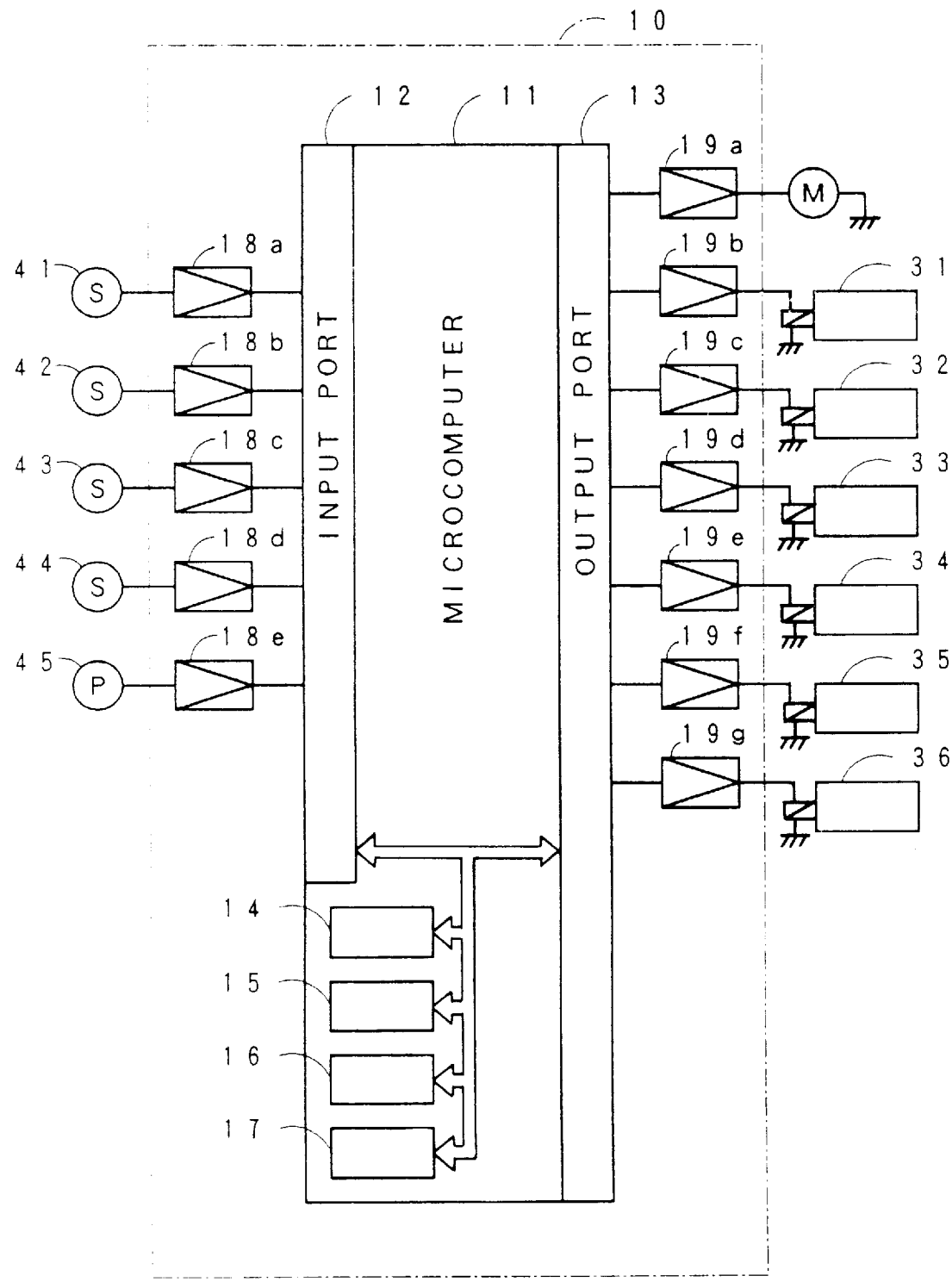
FIG. 3 is a block diagram illustrating the arrangement of an electronic controller as shown in FIG. 2.

As shown in FIG. 3, the electronic controller 10 is provided with a microcomputer 11 having a central processing unit or CPU 14, a read-only memory or ROM 15, a random access memory or RAM 16 and a timer 17, which are connected with an input port 12 and an output port 13 via a common bus to execute the input/output operations relative to external circuits. The signals detected by each of the wheel speed sensors 41 to 44 and the pressure sensor 45 are fed to the input port 12 via respective amplification circuits 18a to 18e and then to the CPU 14. Then, a control signal is output from the output port 13 to the electric motor 20 via a drive circuit 19a, and control signals are fed to the solenoid valves 31 to 36 via the respective drive circuits 19b to 19g. In the microcomputer 11, the ROM 15 memorizes a program corresponding to flowcharts shown in FIGS. 4 and 5, the CPU 14 executes the program while the ignition switch (not shown) is closed, and the RAM 16 temporarily memorizes variable data necessary for executing the program.

Figure 4:
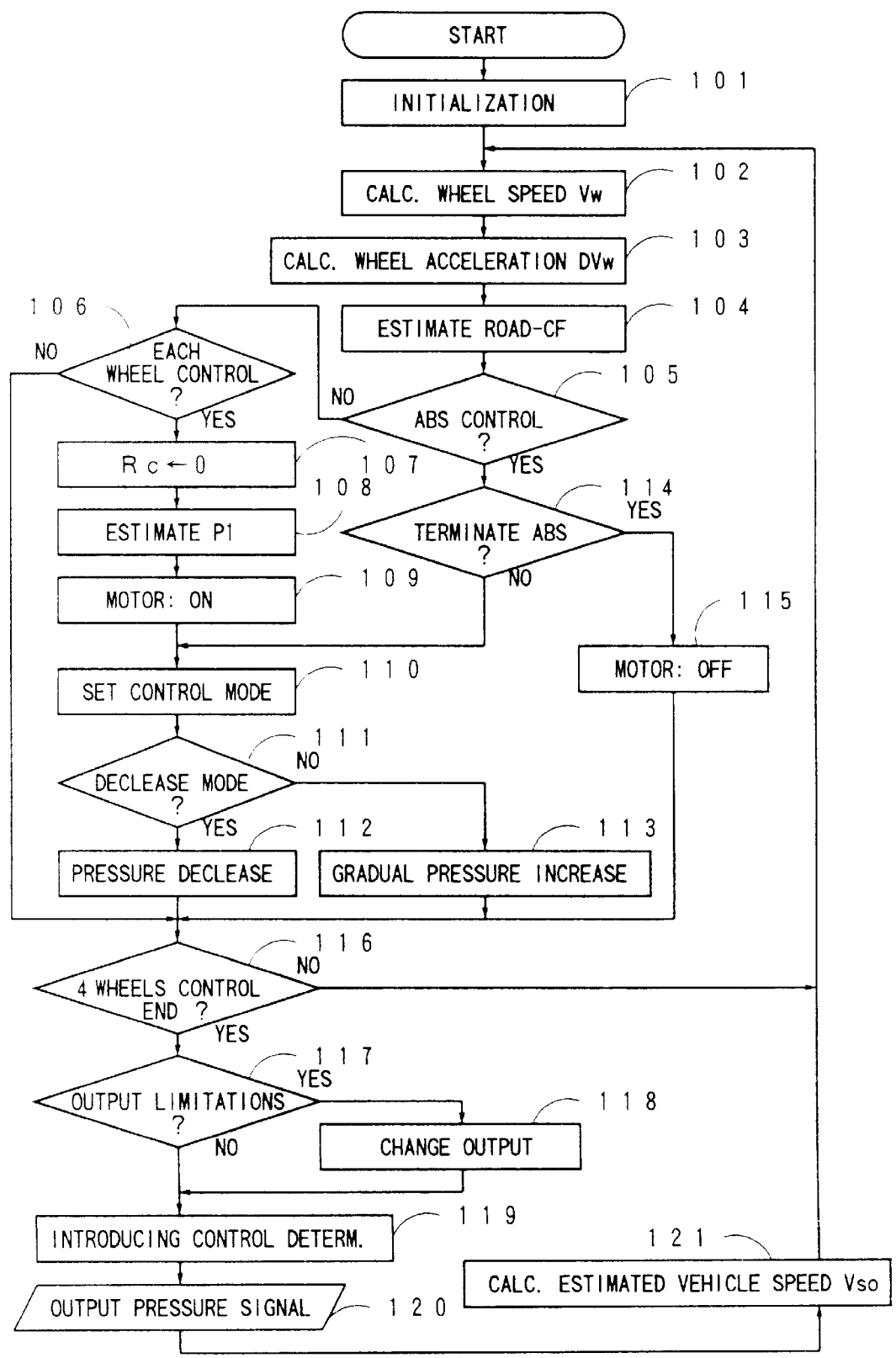
FIG. 4 is a flowchart showing the operation of the braking force control of the electronic controller according to the above embodiment of the present invention.
Figure 5:
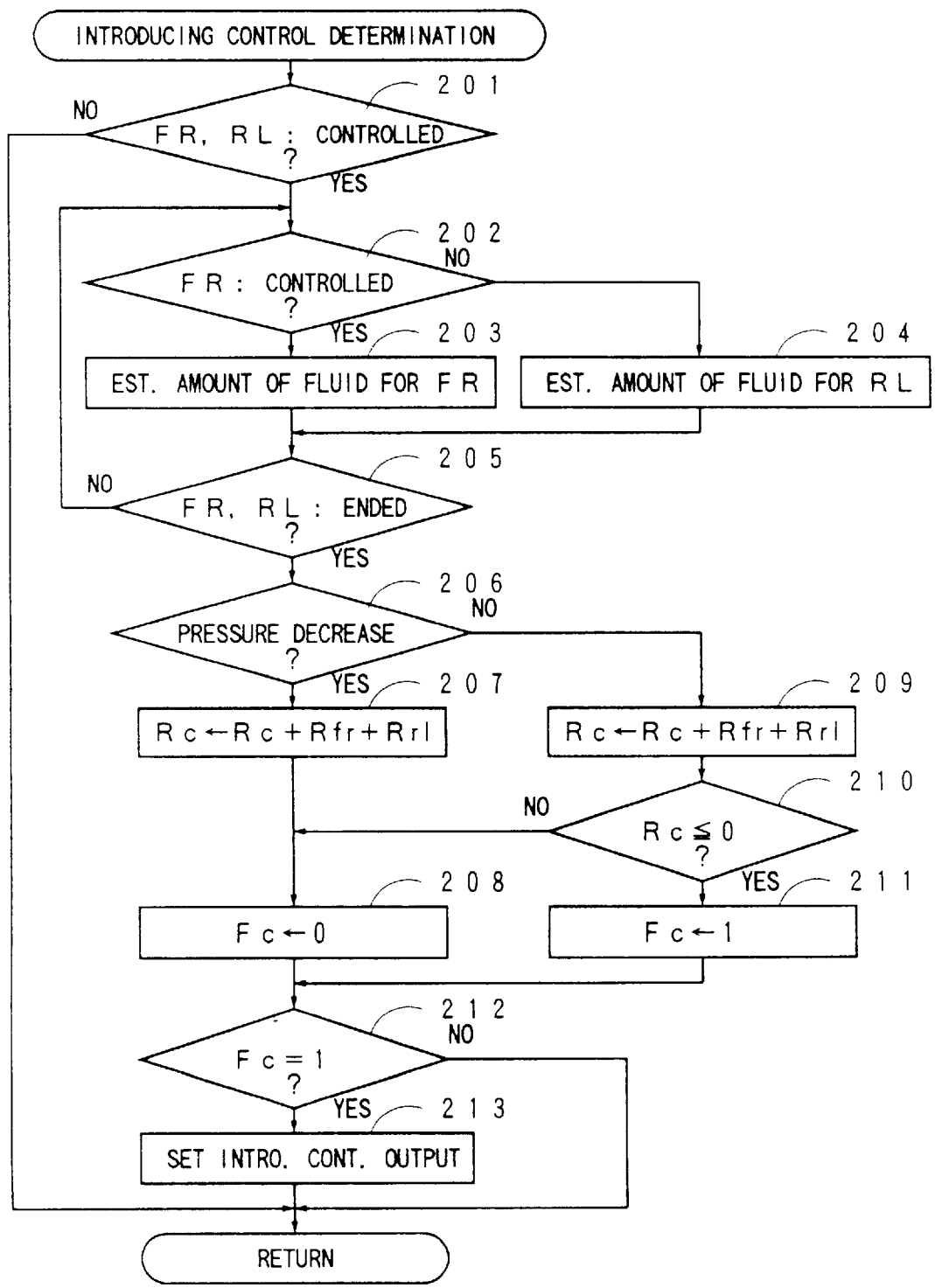
FIG. 5 is a flowchart showing an introducing control determination according to the above embodiment of the present invention.

A program routine executed by the electronic controller 10 for the anti-skid control will now be described with reference to FIGS. 4 and 5. The program routine corresponding to the flowcharts as shown in FIGS. 4 and 5 starts when an ignition switch (not shown) is turned on, and provides for initialization of the system at Step 101 to clear various data such as an estimated vehicle speed Vso, a wheel speed Vw, a wheel acceleration DVw or the like. At Step 102, the wheel speed Vw is calculated in accordance with the output signal from each of the wheel speed sensors 41 to 44, and then the wheel acceleration DVw is calculated from the wheel speed Vw at Step 103. Next, at Step 104, a coefficient of friction of a road surface is estimated before an anti-skid control is initiated, so that either a high-CF or a low-CF is selected for the coefficient of friction of the road surface on which the vehicle is running.

Figure 7:
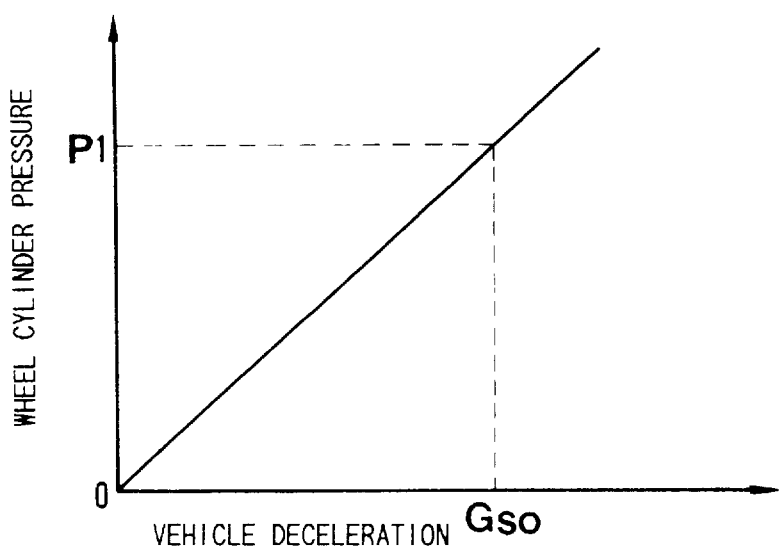
FIG. 7 is a diagram showing the relationship between the vehicle deceleration and the wheel cylinder pressure in the above embodiment of the present invention.

Then, the program proceeds to Step 105 where it is determined whether each of the road wheels is under the anti-skid control (abbreviated as ABS control as shown in FIG. 4), or not. If it is determined that the anti-skid control is being made, the program proceeds to Step 107, otherwise proceeds to Step 106, where it is determined whether the conditions for initiating the anti-skid control are fulfilled or not. If it is determined that the conditions have not been fulfilled, the program jumps to Step 117. At Step 107, the amount of fluid Rc corresponding to the amount of brake fluid in the reservoir 23 is cleared to zero. Then, the program proceeds to Step 108, where the hydraulic braking pressure in a wheel brake cylinder to be controlled (hereinafter, referred to as wheel cylinder pressure) P1 is estimated in accordance with the relationship as shown in FIG. 7 and on the basis of a vehicle deceleration Gso which can be obtained by differentiating the estimated vehicle speed Vso, for example. In the followings, when the wheel cylinder pressure P1 for a certain road wheel (e.g., road wheel FR) to be controlled, P1 is added by two small alphabets (e.g., "fr" is added to provide "Pfr1") corresponding to the certain road wheel (e.g., FR). The pumps 21, 22 are driven when the braking pressure control in the previous cycle is terminated, so that the brake fluid remained in the reservoirs 23, 24 has been discharged. Therefore, the amount of brake fluid actually remained in the reservoirs 23, 24 is zero, when the braking pressure control for the present cycle is initiated. And, the vehicle deceleration Gso and the wheel cylinder pressure P1 are in approximately direct proportion to each other as shown in FIG. 7. Therefore, if the vehicle deceleration Gso is obtained, the wheel cylinder pressure P1 will be estimated with reference to FIG. 7. The wheel cylinder pressure may be detected by a pressure sensor (not shown).

Then, the program proceeds to Step 109 where the electric motor 20 is activated to initiate its rotation. According to the present embodiment, the electric motor 20 starts rotating at the same time as the anti-skid control starts, and keeps rotating until the anti-skid control will end. Therefore, the electric motor 20 in the present embodiment keeps rotating to circulate the brake fluid even in a pressure decrease mode which will be described later. However, the electric motor 20 may be so arranged as to rotate only in a gradual pressure increase mode. And then, at Step 110, one of such control modes as the pressure decrease mode and the gradual pressure increase mode (which may further include a rapid pressure increase mode for use in the normal braking operation, and a hold mode for holding the braking pressure) is set in accordance with the braking condition, which is determined on the basis of the above-described wheel speed Vw, the wheel deceleration DVw and the estimated vehicle speed Vso as described later, and also in accordance with the coefficient of friction of the road surface. The coefficient of friction of the road surface is selected from a high-CF (coefficient of friction), mid-CF and low-CF on the basis of the slip rate, for example, after the control has started, while it is selected on the basis of the estimated result at Step 104 before the control starts, as described before.

The program further proceeds to Step 111, where it is determined if the pressure decrease mode is to be selected as the control mode. If it is determined that the pressure decrease mode is to be selected, the program proceeds to Step 112 where a pressure decrease signal is provided, otherwise it is determined that the gradual pressure increase mode is to be selected, and the program proceeds to Step 113 where a gradual pressure increase signal is provided. In the case where it is determined at Step 105 that the anti-skid control operation is being made, it is determined at Step 114 whether the conditions for terminating the anti-skid control operation have been fulfilled a not. If the terminating conditions have not been fulfilled, the program proceeds to Step 110 where the control mode is selected as described above. On the contrary, if it is determined that the terminating conditions have been fulfilled at Step 114, the electric motor 20 is turned off with a predetermined time delay at Step 115, thereby to stop the pumps 21, 22.

The above-described steps for selecting the control mode and producing the output signals are executed for each wheel cylinder. Then, at Step 116, it is determined whether the steps have been executed with respect to all the four road wheels FR, FL, RR, RL, and the above-described routine is repeated until the ABS control is executed with respect to all the road wheels. After Step 116, it is determined at Step 117 whether any output limitations have been applied or not. If no limitation is applied, the program proceeds to Step 119 where an introducing control determination, which will be described later, is made, while if any one of the limitations is applied, the program proceeds to Step 119 via Step 118. According to the present embodiment, the wheel brake cylinders 51, 54 (52, 53) are connected to the hydraulic pressure generator 2 through the single solenoid valve 35 (36), and communicated such that the brake fluid is supplied from the single pump 21 (22) to both of the wheel brake cylinders 51 and 54 (52, 53). Thus, if one of the paired wheel brake cylinders is in the pressure decrease mode, the gradual pressure increase mode can be provided for the other one of the wheel brake cylinders. However, the wheel brake cylinders 51, 54 (52, 53) can not be connected to the master cylinder 2a for providing the rapid pressure increase mode. Therefore, in the case where the pressure decrease mode is provided for one of the wheel brake cylinders, and neither the pressure decrease mode nor the gradual pressure increase mode is provided for the other one of the wheel brake cylinders, the program proceeds to Step 119, where the output for the other one of the wheel brake cylinders is changed to the gradual pressure increase mode, and thereafter the program proceeds to Step 119 where the introducing control determination is made, as will be described later in detail.

Consequently, at Step 120, the pressure control signals as described above are output to perform the braking pressure control. That is, when the pressure decrease signal is output, the electric current is fed to the solenoid of the solenoid valve 35 for the wheel to be controlled (e.g., road wheel FR), so that the pressure in the wheel brake cylinder 51 to be controlled is decreased, with the brake fluid in the wheel brake cylinder 51 received in the reservoir 23 through the de-energized solenoid valve 31. When the gradual pressure increase signal is output, the electric current is fed to the solenoid coils of the solenoid valves 35 and 31 for the wheel to be controlled (e.g., road wheel FR), the brake fluid in the reservoir 23 is supplied to the wheel brake cylinder 51 through the check valve 61 and orifice 81 thereby to gradually increase the pressure in the wheel brake cylinder 51. In the case where the introducing control is executed, the solenoid valves 35 and 31 for the wheel to be controlled are de-energized, so that the brake fluid discharged from the master cylinder 2a is directly supplied to the wheel brake cylinder 51 for the wheel to be controlled, thereby to apply the pressure to the wheel brake cylinder 51. In case of the normal braking operation without those output signals provided, no electric current is fed to the solenoid coils of the solenoid valves 35 and 31 for the wheel to be controlled, the pressure in the wheel brake cylinder 51 is increased by the braking pressure discharged from the master cylinder 2a. Thereafter, the program proceeds to Step 121, where the estimated vehicle speed Vso is calculated and then returns to Step 102. The road wheels FR, RR, RL are controlled in the same manner as described above.

FIG. 5 illustrates a flowchart of a subroutine for the introducing control determination executed at Step 119, with respect to a circuit including the front road wheel FR and rear road wheel RL as shown at the left side in FIG. 2. When this program starts, it is determined at Step 201 whether the circuit including the road wheels FR, RL is to be controlled or not. Unless either the road wheel FR or the road wheel RL has been determined to be controlled, the program returns to the routine as shown in FIG. 4, then proceeds to a subroutine (not shown) for the circuit of the road wheels FL, RR similar to that as shown in FIG. 5. If it is determined at Step 201 that the circuit of the road wheels FR, RL is to be controlled, then it is further determined at Step 202 which one of the road wheels FR, RL is to be controlled. If the road wheel FR is to be controlled, the program proceeds to Step 203 where the amount of brake fluid stored in the reservoir 23 is estimated. If the road wheel RL is to be controlled, the amount of brake fluid in the reservoir 23 is estimated, as well. The estimation executed at Step 203 is the substantially same as that executed at Step 204, which will be described later with reference to FIG. 6.

When it is determined at Step 205 that the estimations for the road wheels FR and RL ended, the program proceeds to Step 206 where it is determined if the pressure decrease mode is provided for the road wheel FR or the road wheel RL. If the pressure decrease mode is provided for either the road wheel FR or road wheel RL at Step 206, the program proceeds to Step 207 where the total amounts Rfr, Rrl of the amount of fluid fed from the circuit for the road wheels FR, RL into the reservoir 23 respectively, i.e., (+)Rfr, (+)Rrl, and the amount of fluid discharged from the circuit for the road wheels FR, RL respectively, i.e., (−)Rfr, (−)Rrl, are added to (or subtracted from) the amount of fluid Rc stored in the reservoir 23 thereby to renew the amount of fluid Rc. Then, an introducing control flag Fc is reset to be zero at Step 208. In the case where the pressure decrease mode is not provided for both of the road wheels FR and RL, the amount of fluid Rc in the reservoir 23 is renewed at Step 209 as executed at Step 207, and thereafter it is determined at Step 210 whether the calculated amount of fluid Rc in the reservoir 23 is equal to or less than zero, or not. If it is determined at Step 210 that the amount of fluid Rc in the reservoir 23 is equal to or less than zero, the program proceeds to Step 211 where the introducing control flag Fc is set (1), otherwise, the program proceeds to Step 208 where the flag Fc is reset (0), and further proceeds to Step 212 in both cases.

Figure 12:
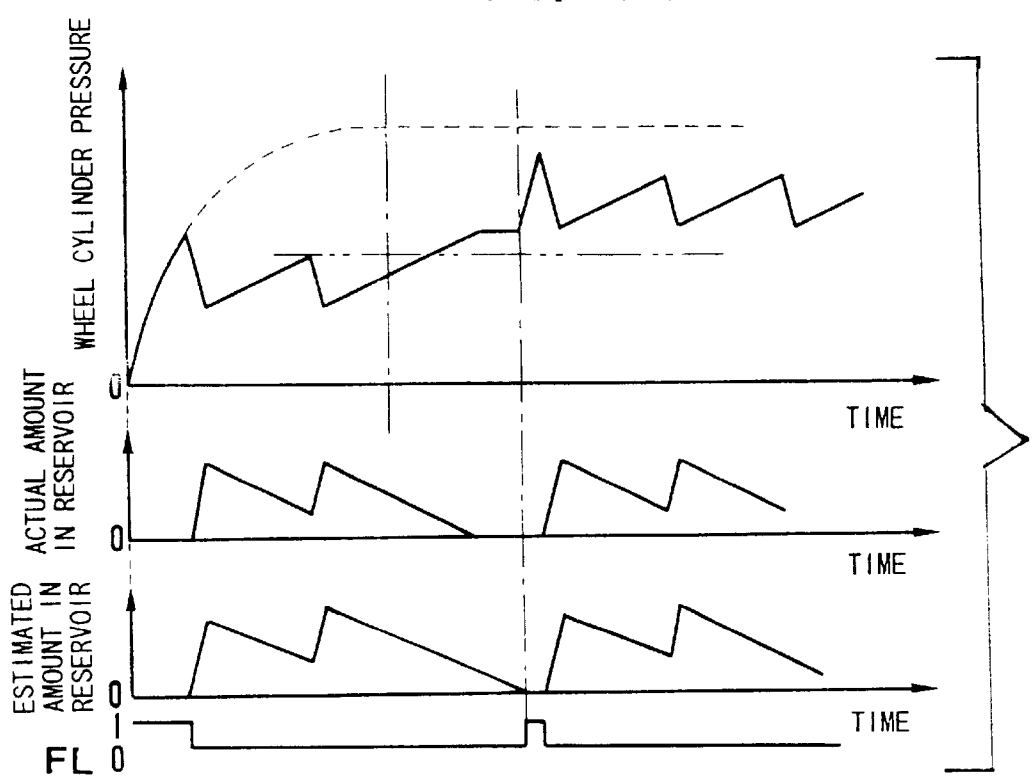
FIG. 12 is a diagram showing an example of an introducing control operation in the above embodiment.
Figure 13:
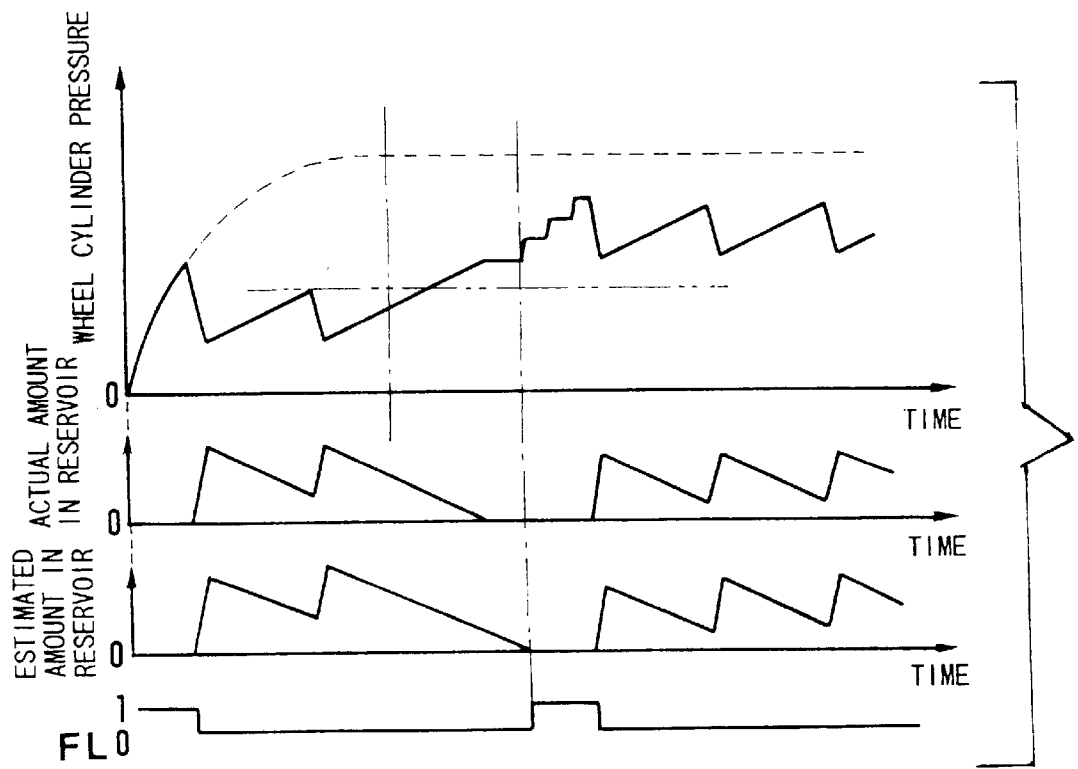
FIG. 13 is a diagram showing another example of the introducing control operation in the above embodiment.

Accordingly, if the introducing control flag Fc has been set, the introducing control output signal is set at Step 213, otherwise the program returns to the main routine as shown in FIG. 4. An example which is executed as described above is shown in FIGS. 12 and 13, in which the actually measured value of the amount of brake fluid in the reservoir is shown at the upper row and its estimated value is shown at the lower row. FIG. 12 illustrates an example wherein the brake fluid is rapidly introduced from the master cylinder 2a into the reservoir 23 in a short period of time, while FIG. 13 illustrate an example wherein the brake fluid is gradually introduced into the reservoir 23. Although a rapid control will be made in the former example, it might cause an overshooting. Therefore, the latter example is employed in the present embodiment.

Figure 6:
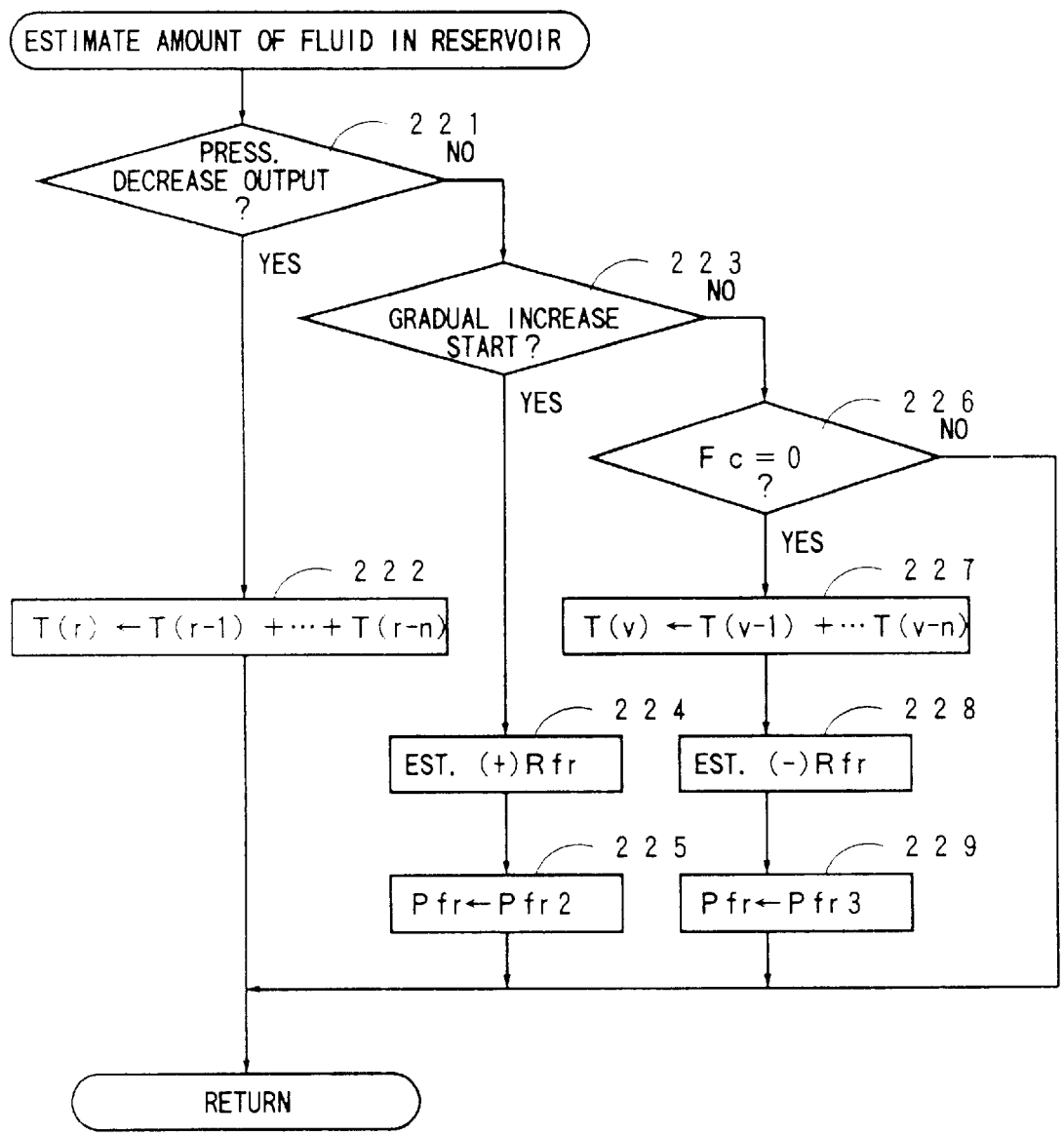
FIG. 6 is a flowchart showing the estimation of the amount of fluid according to the above embodiment.
Figure 8:
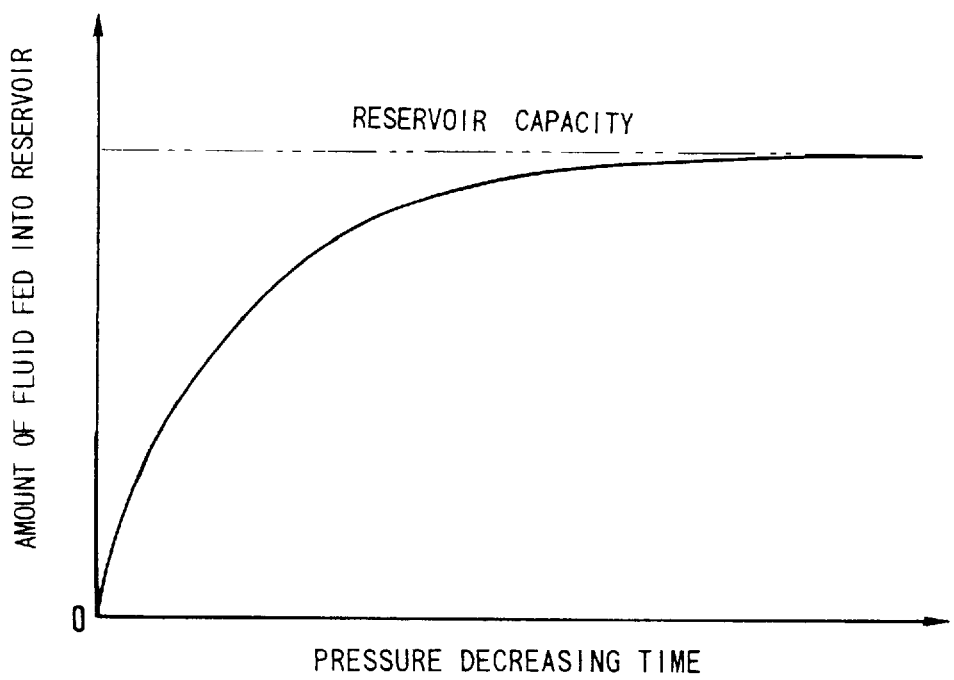
FIG. 8 is a diagram showing the relationship between the pressure decreasing time and the amount of brake fluid fed into the reservoir in the above embodiment of the present invention.

FIG. 6 illustrates a sub-routine for the estimation of the amount of brake fluid in the reservoir executed at Steps 203, 204 with respect to the road wheel FR, and executed as well with respect to the road wheel RL. At the outset, it is determined at Step 221 whether the pressure decrease signal is being output for controlling the road wheel FR, or not. If the pressure decreasing operation has been made, a period of time T(r) lapsed from the start of the pressure decreasing operation is renewed at Step 222 and the program returns to Step 205 in FIG. 5. If it is determined at Step 221 that the pressure decrease signal has not been output, the program proceeds to Step 223, where it is determined whether the gradual pressure increasing operation has already started. If it has started, the program proceeds to Step 224, where the amount of fluid (+)Rfr fed from the wheel brake cylinder 51 to the reservoir 23 in response to the pressure decreasing operation (the amount of fluid (+)Rrl fed into the reservoir 23 with respect to the road wheel RL) is estimated on the basis of the relationship as shown in FIG. 8. The property as shown in FIG. 8 is varied in accordance with the wheel cylinder pressure provided at the time when the pressure decreasing operation has started. Therefore, it is so arranged that a plurality of maps with various properties provided in accordance with the variations of the wheel cylinder pressure are stored in the memory, and can be read from the memory at an appropriate time.

Figure 9:
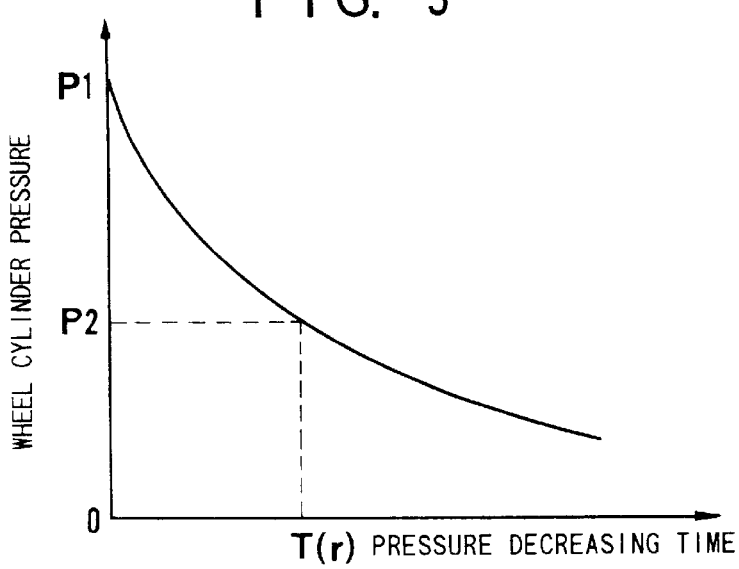
FIG. 9 is a diagram showing the relationship between the pressure decreasing time and the wheel cylinder pressure in the above embodiment.

Then, the program proceeds to Step 225, where the wheel cylinder pressure Pfr2 which is to be provided at the time when the latest pressure decreasing time T(r) renewed at Step 222 has lapsed, can be obtained with reference to FIG. 9 which shows the pressure decreasing characteristics (in FIG. 9, the wheel cylinder pressure of each wheel is represented by P1) in the case where the wheel cylinder pressure was estimated to be "Pfr1" when the control started, at Step 108 in FIG. 4. And, the present wheel cylinder pressure Pfr is renewed by the wheel cylinder pressure Pfr2. If it is determined at Step 223 that the gradual pressure increasing operation has not started, the program proceeds to Step 226, where it is determined whether the introducing control flag Fc has been set (1) or not. When the flag Fc has been set, the program proceeds to Step 205 in FIG. 5, otherwise it proceeds to Step 227.

Figure 10:
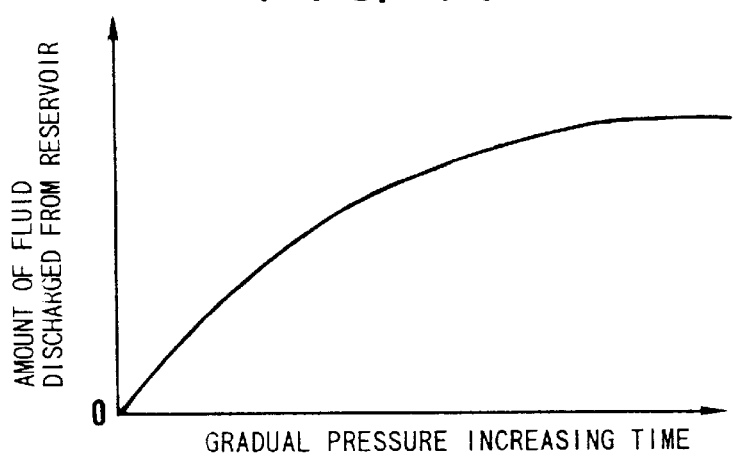
FIG. 10 is a diagram showing the relationship between the gradual pressure increasing time and the amount of brake fluid discharged from the reservoir in the above embodiment.
Figure 11:
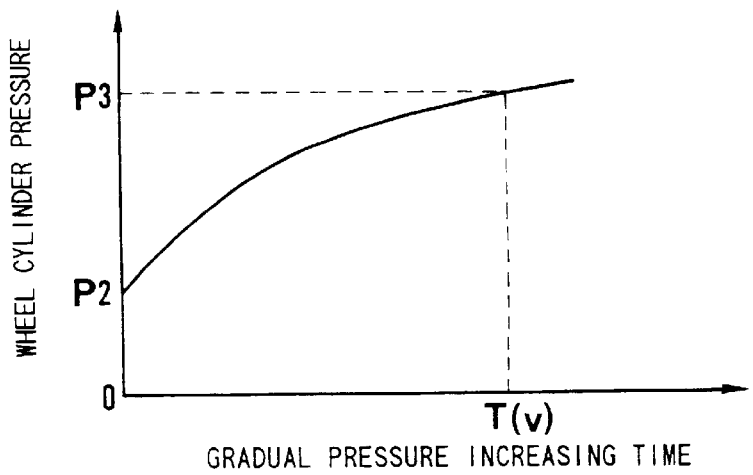
FIG. 11 is a diagram showing the relationship between the gradual pressure increasing time and the wheel cylinder pressure in the above embodiment.

At Step 227, a period of time T(v) after the gradual pressure increasing operation started is obtained, and then at Step 228, the amount of brake fluid discharged from the reservoir 23 for the road wheel FR, (−)Rfr is estimated with reference to FIG. 10, which shows the relationship between the gradual pressure increasing time T(v) and the amount of fluid discharged from the reservoir 23. The amount of discharged fluid with respect to the road wheel RL is indicated by (−)Rfl. The property as shown in FIG. 10 is varied in accordance with the variations of wheel cylinder pressure provided at the time when the gradual pressure increasing operation has started, so that various properties are stored in the form of the maps in the memory. Then, the program proceeds to Step 229, where the wheel cylinder pressure Pfr3 which is to be provided at the time when the latest gradual pressure increasing time T(v) renewed at Step 227 has lapsed, can be estimated with reference to FIG. 11 of the gradual pressure increasing characteristics (in FIG. 11, the wheel cylinder pressure of each wheel is represented by P2) in the case where the wheel cylinder pressure Pfr2 was obtained at Step 225. And, the present wheel cylinder pressure Pfr is renewed by the wheel cylinder pressure Pfr3.

Figure 14:
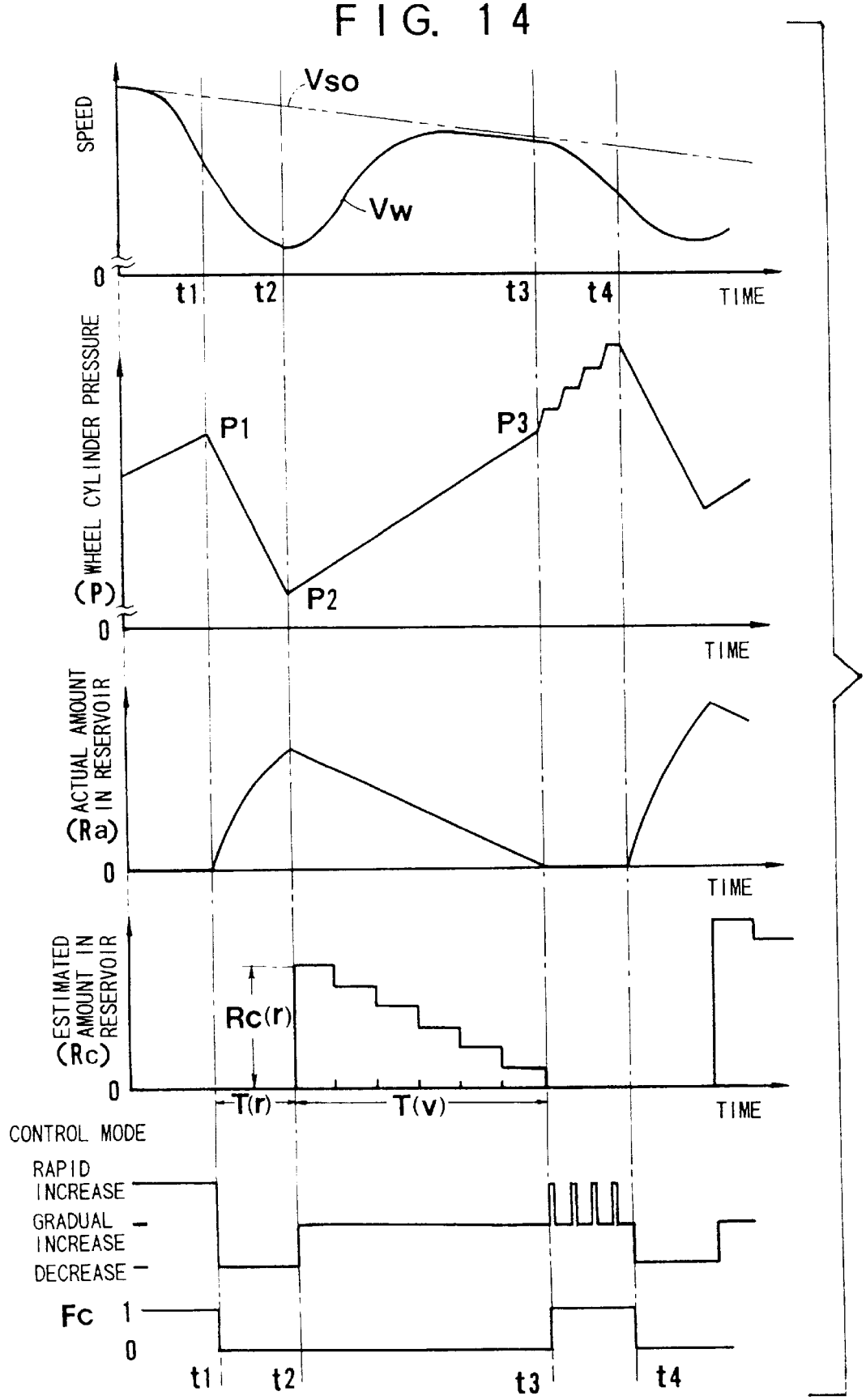
FIG. 14 is a diagram showing an operation according to the above embodiment.
Figure 21:
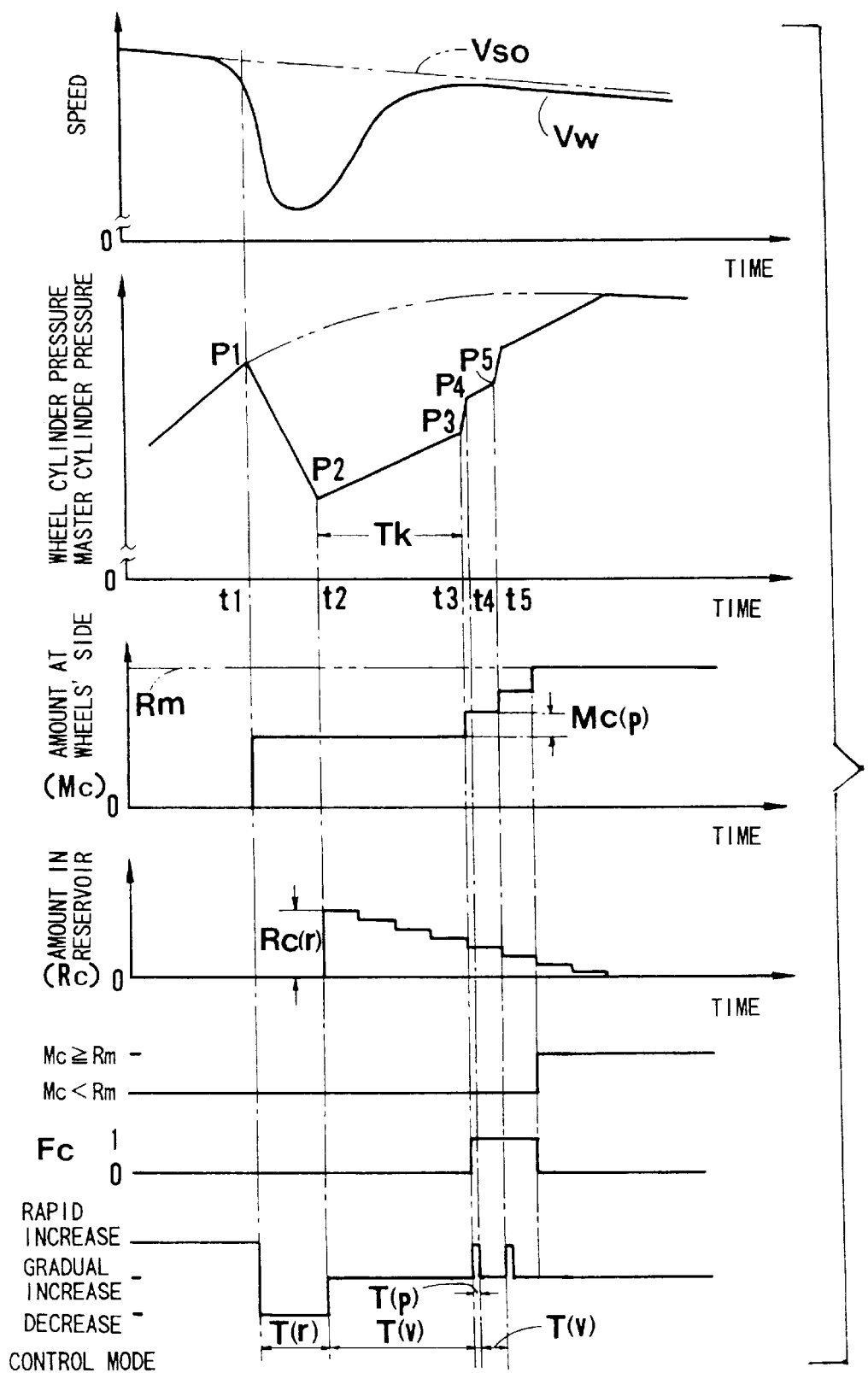
FIG. 21 is a diagram showing an operation according to another embodiment.
Figure 22:
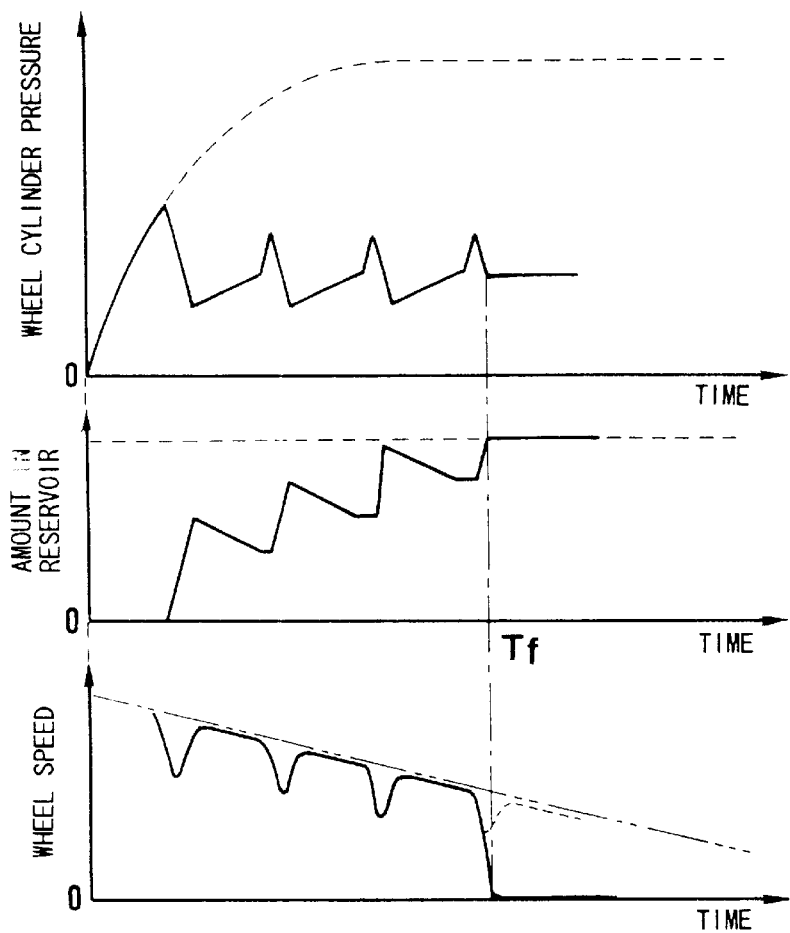
FIG. 22 is a diagram showing the controlling property of an anti-skid control system in the prior art.
Figure 23:
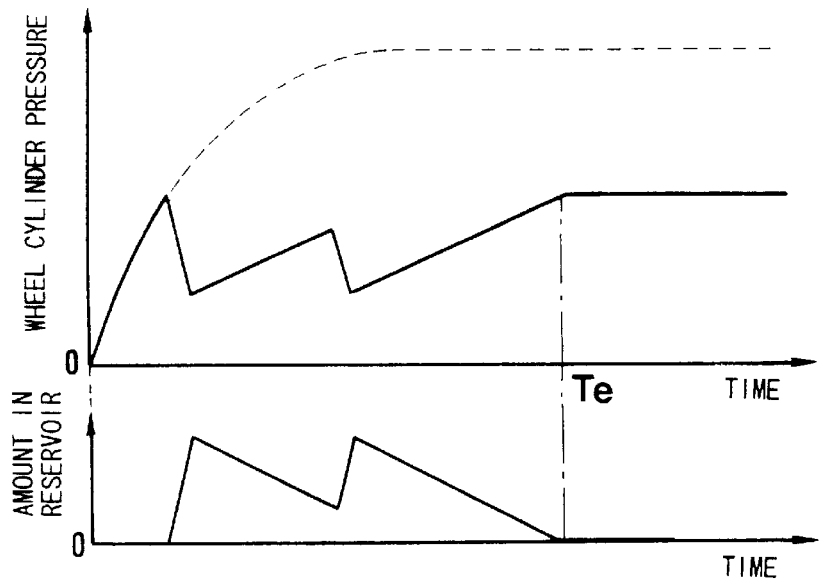
FIG. 23 is a diagram showing the controlling property of an anti-skid control system in the prior art.

The operation of the above-described embodiment will be explained hereinafter with reference to FIG. 14. In FIG. 14 and FIG. 21 which will be described later, it is shown that the pressure decrease and gradual pressure increase modes for the road wheel FR are synchronous with those for the road wheel RL, so as to explain the operation of the embodiment easily. In FIG. 14, when the braking operation is initiated, and the anti-skid control operation starts at the point t1 (at this time, the wheel cylinder pressure is indicated by P1), whereby the rapid pressure increase mode is shifted to the pressure decrease mode, so that the actual amount of brake fluid fed into the reservoir 23 is increased as shown by (Ra) in FIG. 14. When the pressure decrease mode is shifted to the gradual pressure increase mode at the point t2 after the lapse of the pressure decreasing time T(r), the amount of fluid Rc in the reservoir 23 is estimated to be Rc(r) as shown by (Rc) in FIG. 14. Thereafter, the amount of brake fluid in the reservoir 23 is consumed in the gradual pressure increasing operation thereby to be gradually decreased, so that the amount of fluid Rc of the estimated amount is decreased every cycle to form steps as shown in FIG. 14. When the introducing control flag Fc is set at the point t3, the introducing control operation is performed until the point t4. According to the present embodiment, the rapid pressure increasing operation is made intermittently (with the solenoid valves 35, 31 or the like turned OFF), the brake fluid is supplied from the master cylinder 2a directly to the wheel brake cylinder, thereby to increase the wheel cylinder pressure P. Thereafter, when the pressure decrease mode is selected again after the point t4, the amount of fluid Ra, Rc in the reservoir 23 is rapidly increased. The amount of fluid in the reservoir 24 is estimated in accordance with the operations for the road wheels FL, RR, in the same manner as described heretofore.

According to the present embodiment, therefore, the amount of brake fluid in the reservoirs 23, 24 may be estimated properly without any fluid sensor provided, so that immediately after the amount of brake fluid becomes zero, the brake fluid is supplied from the master cylinder 2a directly to the wheel brake cylinder to increase the pressure therein. In the present embodiment, the actuator for the anti-skid control is made low in cost, by two 3-port 2-position solenoid operated changeover valves and four 2-port 2-position solenoid operated changeover valves, i.e., six valves in total. That is, any expensive 3-port 3-position solenoid operated changeover valves are not provided in the present embodiment, but the desired anti-skid control operation may be achieved by the smallest number of valves, without causing an impact against the brake pedal during the pressure control (so-called, a kick-back phenomenon).

Figure 15:
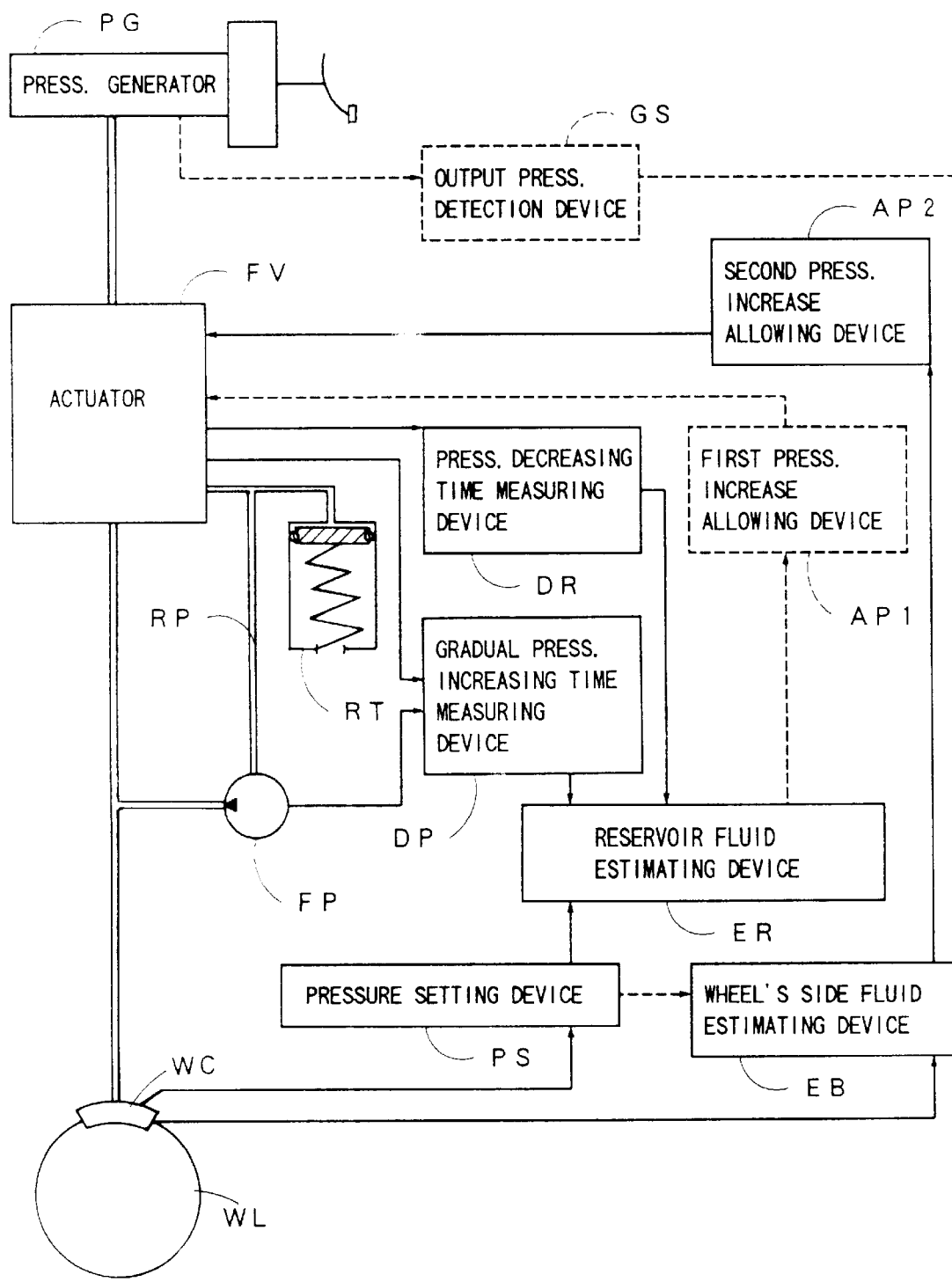
FIG. 15 is a general block diagram illustrating an anti-skid control system according to another embodiment of the present invention.

FIGS. 15 to 20 illustrate another embodiment of the present invention, wherein even before the brake fluid in the reservoir 23 is drained completely, if the amount of brake fluid in the circuit at the wheel's side (i.e., the hydraulic circuit extending from the solenoid valves 35, 36 to each wheel brake cylinder) has not exceeded the capacity of the reservoir 23, the rapid pressure increasing operation can be made by introducing the brake fluid from the master cylinder 2a to each wheel brake cylinder, so that the rapid pressure increasing operation can be made at an early timing. According to the present embodiment as illustrated in FIG. 15, in addition to the system as illustrated in FIG. 1, a wheel's side fluid estimating device EB is provided for estimating the amount of brake fluid fed from the hydraulic pressure generator PG to a hydraulic circuit at the wheel's side including the wheel brake cylinder WC, and a second pressure increase allowing device AP2 is provided for controlling the actuator FV so as to allow the hydraulic pressure generator PG to communicate with the wheel brake cylinder WC, when the amount of brake fluid estimated by the wheel's side fluid estimating device EB is smaller than the capacity of the reservoir RT. As indicated by a phantom line in FIG. 15, an output pressure detection device GS may be provided for detecting a braking pressure output from the hydraulic pressure generator PG, and the wheel's side fluid estimating device EB is arranged to estimate the amount of brake fluid fed to the hydraulic circuit at the wheel's side, on the basis of the difference between the pressure output from the hydraulic pressure generator PG detected by the output pressure detection device GS and the pressure in the wheel brake cylinder set by the pressure setting device PS.

The practical structure in this embodiment is the basically same as that shown in FIGS. 2 and 3, and the main routine executed in this embodiment is the same as that shown in FIG. 4. In this embodiment, however, a pressure sensor 45 (shown in FIG. 3) must be provided for detecting the pressure of the brake fluid discharged from the master cylinder 2a, and the introducing control determination as executed at Step 120 in FIG. 4 is executed according to the flowcharts of FIGS. 16 and 17. The introducing control determination according to the present embodiment will be explained hereinafter with reference to FIGS. 16–21.

Figure 16:
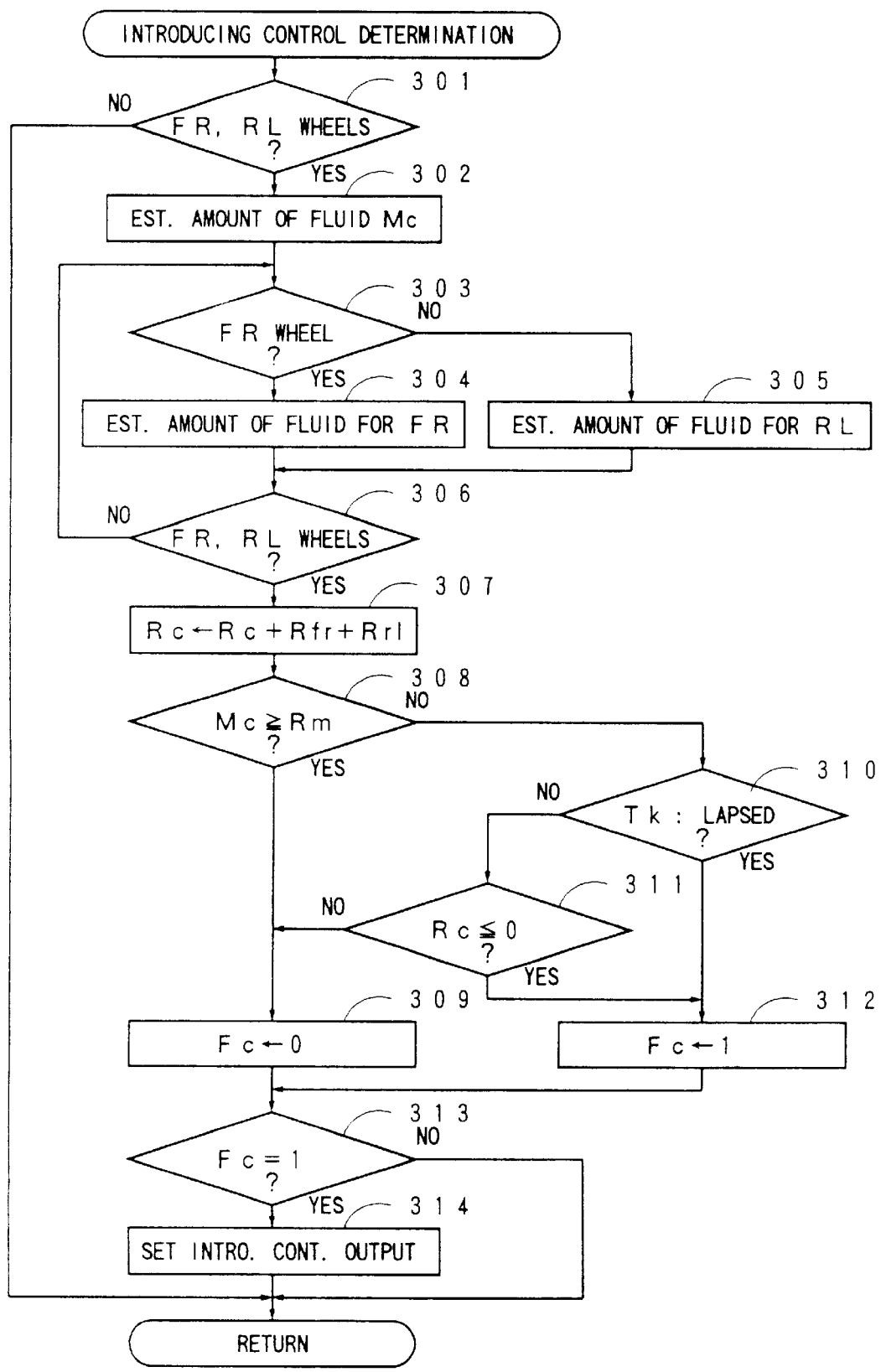
FIG. 16 is a flowchart showing an introducing control determination according to another embodiment of the present invention.

First of all, it is determined at Step 301 whether the circuit including the road wheels FR, RL is to be controlled or not. Unless either the road wheel FR or the road wheel RL has been determined to be controlled, the program returns to the routine as shown in FIG. 4, then proceeds to a subroutine for the circuit of the road wheels FL, RR similar to that as shown in FIG. 16. If it is determined at Step 302 that either one of the road wheels FR, RL is to be controlled, the program proceeds to Step 302 where the amount of fluid Mc in the circuit at the wheel's side is estimated. The amount of brake fluid, which is supplied from the master cylinder 2a to the wheel brake cylinders 51 to 54 after the braking operation starts until the anti-skid operation starts to close the solenoid valve 35 (or 36), can be calculated on the basis of the braking pressure discharged from the master cylinder 2a, so that it corresponds to the amount of fluid Mc. In the present embodiment, the wheel cylinder pressure P1 when the control started (at the point t1 in FIG. 21) is estimated at Step 108 in FIG. 4.

Then, the program proceeds to Step 302 where it is further determined which one of the road wheels FR, RL is to be controlled. If the road wheel FR is to be controlled, the program proceeds to Step 304 where the amount of brake fluid stored in the reservoir 23 is estimated. If the road wheel RL is to be controlled, the amount of brake fluid in the reservoir 23 is estimated, as well, and further proceeds to Step 306. The estimation executed in Step 304 is the substantially same that in Step 305, which will be described later with reference to FIG. 17. When it is determined that the estimations for the road wheels FR and RL ended, the program proceeds to Step 307 where the sum of the amount of brake fluid fed into the reservoir 23 and the amount of fluid discharged from the reservoir 23 for both of the road wheels FR, RL, i.e., both of the total values Rfr, Rfl are added to (or subtracted from) the amount of fluid Rc in the reservoir 23 at that time, so that the amount of fluid Rc is renewed.

Then, the program proceeds to Step 308 where the amount of fluid Mc at the wheel's side is compared with the capacity Rm of the reservoir 23. If the amount of fluid Mc is equal to or more than the capacity Rm, the introducing control flag Fc is reset to zero at Step 309, and the program proceeds to Step 313, otherwise it proceeds to Step 310. It is determined at Step 310 whether a predetermined time Tk has lapsed or not after the pressure decreasing operation ended. If the time Tk has not lapsed, the program proceeds to Step 311 where it is determined whether the amount of fluid Rc in the reservoir 23 becomes zero. If it is determined that the amount of fluid Rc in the reservoir 23 is equal to or less than zero, the program proceeds to Step 312, otherwise the program proceeds to Step 309 where the introducing control flag Fc is reset, and further proceeds to Step 313. If the predetermined time Tk has lapsed after the end of the pressure decreasing operation, the introducing control flag Fc is set (1) at Step 312, then the program proceeds to Step 313. Accordingly, if the flag Fc is set, the introducing control signal is provided at Step 314, otherwise, the program returns to the main routine in FIG. 4.

Figure 17:
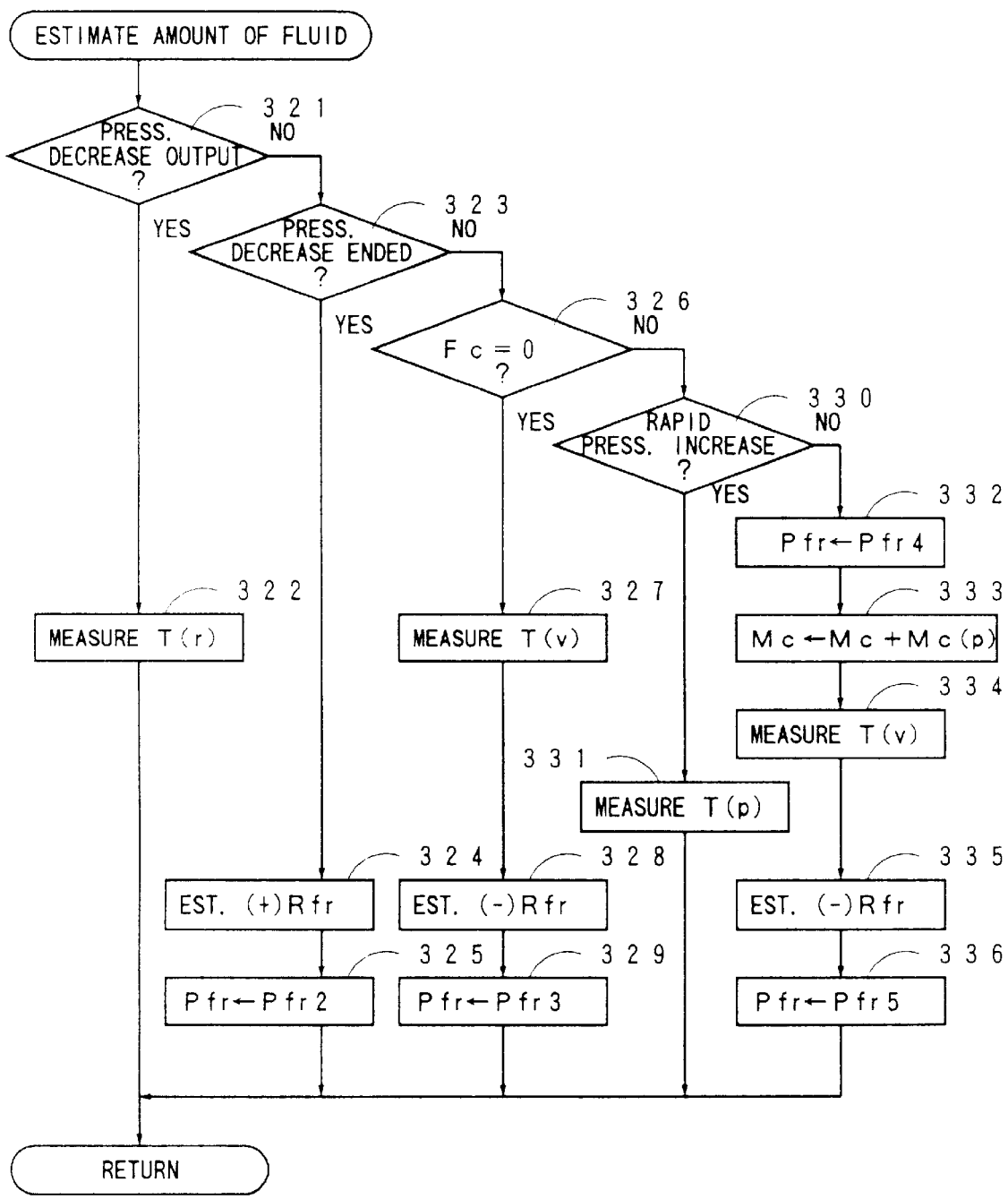
FIG. 17 is a flowchart showing the estimation of the amount of brake fluid according to another embodiment.
Figure 19:
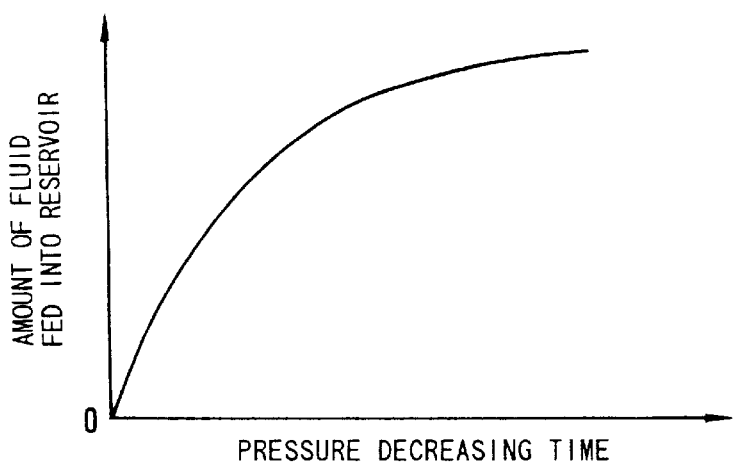
FIG. 19 is a diagram showing the relationship between the pressure decreasing time and the amount of brake fluid fed into the reservoir in the above embodiment.

FIG. 17 illustrates a sub-routine for the estimation of the amount of fluid executed at Steps 304, 305 with respect to the road wheel FR, and executed as well with respect to the road wheel RL. At the outset, it is determined at Step 321 whether the pressure decrease signal is being output for controlling the road wheel FR, or not. If the pressure decreasing operation is being performed, the time T(r) lapsed from the start of the pressure decreasing operation is renewed at Step 322 and the program returns to Step 306 in FIG. 16. If it is determined at Step 321 that the pressure decrease signal has not been output, the program proceeds to Step 323, where it is determined whether the pressure decreasing operation has already ended, or not. If it has ended, the program proceeds to Step 324, where the amount of fluid (+)Rfr fed from the wheel brake cylinder 51 to the reservoir 23 in response to the pressure decreasing operation, which is made by closing the solenoid valve 35 or 36 when the latest time T(r) renewed at Step 322 has lapsed, is estimated on the basis of the relationship as shown in FIG. 19 which corresponds to FIG. 8. Then, the program proceeds to Step 325, where the wheel cylinder pressure Pfr2 which is to be provided at the time when the latest pressure decrease time T(r) renewed at Step 322 has lapsed (at the point t2 in FIG. 21), can be obtained with reference to FIG. 9 of the pressure decreasing characteristics wherein the wheel cylinder pressure was estimated to be "Pfr1" when the control started. And, the wheel cylinder pressure Pfr at that time is renewed by the wheel cylinder pressure Pfr2.

If it is determined at Step 323 that the pressure decreasing operation has not ended, i.e., the rapid increasing operation or gradual increasing operation is being performed, the program proceeds to Step 326, where it is determined whether the introducing control flag Fc is set (1) or not. When the flag Fc is set, the program proceeds to Step 330. If the flag Fc is not set, it means that the operation is in the gradual pressure increase mode, so that the program proceeds to Step 327, where the time T(v) after the gradual pressure increasing operation started (i.e., the time from the point t2 to the point t3 in FIG. 21) is obtained. Then at Step 328, the amount of brake fluid discharged from the reservoir 23 for the road wheel FR, (−)Rfr is estimated with reference to FIG. 20 which corresponds to FIG. 10. Then, the program proceeds to Step 325, where the wheel cylinder pressure Pfr3 which is to be provided at the time when the latest gradual pressure increasing time T(v) renewed at Step 327 has lapsed (at the point t3 in FIG. 21), can be obtained with reference to FIG. 11 of the gradual pressure increasing characteristics in the case where the wheel cylinder pressure Pfr2 was obtained at Step 325. And, the present wheel cylinder pressure Pfr is renewed by the wheel cylinder pressure Pfr3.

Figure 18:
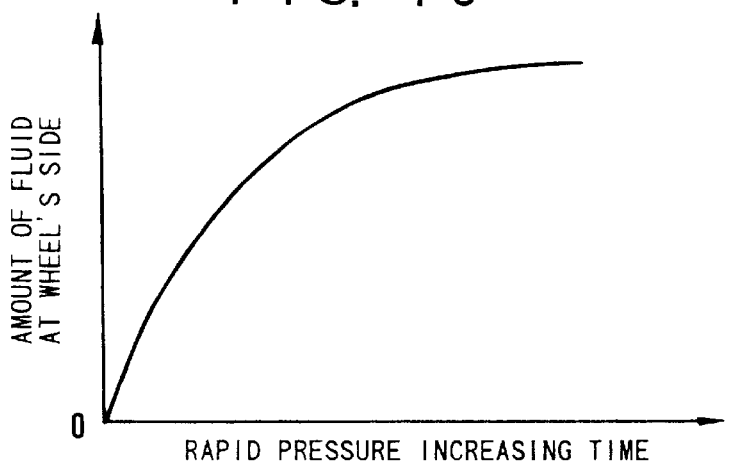
FIG. 18 is a diagram showing the relationship between the rapid pressure increasing time and the amount of brake fluid at the wheel's side in another embodiment of the present invention.

It is determined at Step 330 which one of the rapid pressure increasing operation and the gradual pressure increasing operation is being performed when the introducing control is executed. If the rapid pressure increasing operation is being performed, so that the braking pressure discharged from the master cylinder 2a is being directly applied to the wheel brake cylinder 51 (or 52), then the program proceeds to Step 331, where a period of time T(p) lapsed from the start of the rapid pressure increasing operation (i.e., a period of time from the point t3 to the point t4 in FIG. 21) can be obtained. Whereas, if it is determined at Step 330 that the gradual pressure increasing operation is being performed (therefore, at the previous cycle the rapid pressure increasing operation was performed), the program proceeds to Step 332, where the wheel cylinder pressure Pfr4 after the introducing control is obtained on the basis of the rapid pressure increasing time T(p) obtained at Step 331, the master cylinder pressure at the time when the introducing control started (measured by the pressure sensor 45), and the wheel cylinder pressure (estimated on the basis of the vehicle deceleration Gso), and the wheel cylinder pressure Pfr is renewed by the wheel cylinder pressure Pfr4. Then, the program proceeds to Step 333, where the amount of fluid Mc(p) of the brake fluid introduced into the circuit at the wheel's side by the pressure increasing operation during the introducing control, is obtained in accordance with the property as shown in FIG. 18, and on the basis of the relationship between the pressure difference between the master cylinder pressure and the wheel cylinder pressure at the time when the introducing control started, and the rapid pressure increasing time T(p). The amount of fluid Mc(p) is added to the amount of fluid Mc in the circuit at the wheel's side, which was estimated at Step 302, so that the amount of fluid Mc is renewed.

Figure 20:
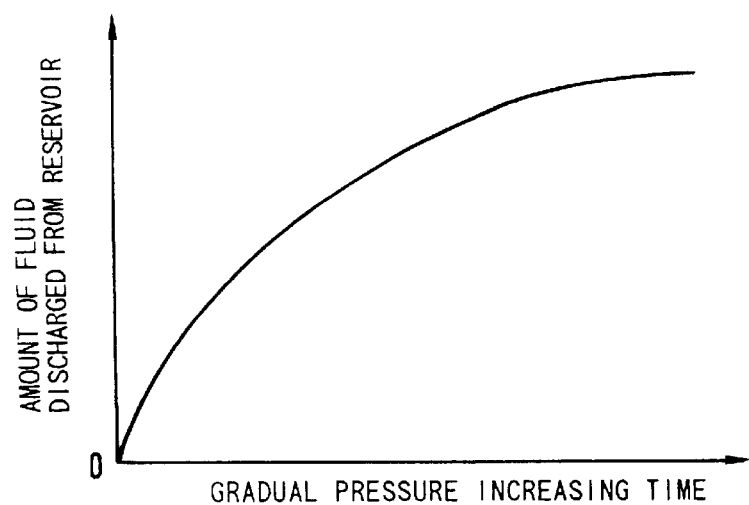
FIG. 20 is a diagram showing the relationship between the gradual pressure increasing time and the amount of brake fluid discharged from the reservoir in another embodiment.

After the gradual pressure increasing time T(v) lapsed from the end of the rapid pressure increasing operation (i.e., the time from the point t4 to t5 in FIG. 21) was obtained at Step 334, the amount of brake fluid discharged from the reservoir 23, i.e., (−)Rfr is obtained in accordance with FIG. 20 which shows the relationship between the gradual pressure increasing time T(v) and the amount of discharged fluid (−)Rfr. Also, on the basis of the relationship between the gradual pressure increasing time T(v) and the wheel cylinder pressure Pfr4 at the end of the pressure increasing operation obtained at Step 332, is obtained the present wheel cylinder pressure Pfr5, by which the wheel cylinder pressure Pfr is renewed at Step 336. The properties as shown in FIGS. 18–20 are varied in accordance with the wheel cylinder pressure, so that it is so arranged that a plurality of maps with various properties provided in accordance with various wheel cylinder pressures are stored in the memory, and can be read from the memory at an appropriate time.

According to the present embodiment, provided that (A) the amount of fluid Mc at the wheel's side has not exceeded the capacity Rm of the reservoir 23, and (B) the time lapsed from the end of the pressure decreasing operation has exceeded the predetermined time Tk, or (C) the estimated amount of fluid in the reservoir 23 has become equal to or less than zero, then the control for introducing the brake fluid from the master cylinder 2a into a wheel cylinder is allowed. That is, under such conditions of (A) AND (B) OR (C) as described above, it is determined whether the introducing control is to be initiated, and the rapid pressure increasing operation can be made by the control for introducing the brake fluid from the master cylinder 2a into the wheel brake cylinder, even if there remains the brake fluid in the reservoir 23. Furthermore, (D) the state wherein the wheel speed Vw is approximately equal to the estimated vehicle speed has continued for a predetermined time Tk2, (E) a predetermined time TK3 has lapsed from the start of the anti-skid control operation, or (F) the wheel speed Vw is greater than a standard speed Vsn which is calculated from the estimated vehicle speed Vso, and at the same time, the wheel acceleration exceeds a predetermined value Gk, may be employed as an "OR" factor for determining if the introducing control is initiated. According to the present embodiment, therefore, the timing for increasing the pressure will be advanced to provide an immediate anti-skid control operation, comparing with the embodiment as described before with reference to FIG. 5.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. An anti-skid control system for controlling a braking force applied to road wheels of an automotive vehicle, comprising:

a wheel brake cylinder operatively connected to a road wheel of said vehicle for applying braking force thereto;

a hydraulic pressure generator for supplying a pressurized brake fluid to said wheel brake cylinder;

actuating means disposed between said hydraulic pressure generator and said wheel brake cylinder for controlling the hydraulic braking pressure in said wheel brake cylinder;

a reservoir communicated with said actuating means, said reservoir having a capacity for storing a predetermined amount of brake fluid, and said reservoir storing the brake fluid in said wheel brake cylinder through said actuating means to decrease the pressure in said wheel brake cylinder;

a return passage for communicating said reservoir with said wheel brake cylinder;

a pressure pump disposed in said return passage, said pressure pump having an inlet port communicated with said reservoir and an outlet port communicated with said wheel brake cylinder for discharging a pressurized brake fluid thereto, whereby upon actuation of said actuating means to block the communication between said hydraulic pressure generator and said wheel brake cylinder, said pressure pump can discharge the brake fluid stored in said reservoir into said return passage to gradually increase the pressure in said wheel brake cylinder;

pressure decreasing time measuring means for measuring a time for decreasing the pressure in said wheel brake cylinder by said actuating means;

gradual pressure increasing time measuring means for measuring a time for gradually increasing the pressure in said wheel brake cylinder by said actuating means and said pressure pump;

pressure setting means for initially setting the pressure in said wheel brake cylinder provided when said actuating means starts decreasing the pressure in said wheel brake cylinder, said pressure setting means resetting the pressure in accordance with the pressure decreasing time; and reservoir fluid estimating means for estimating the amount of brake fluid stored in said reservoir on the basis of the amount of brake fluid fed into said reservoir and the amount of brake fluid discharged from said reservoir, said reservoir fluid estimating means estimating the amount of brake fluid fed into said reservoir on the basis of the pressure in said wheel brake cylinder when the pressure decreasing operation starts, and in response to the pressure decreasing time thereafter, and said reservoir fluid estimating means estimating the amount of brake fluid discharged from said reservoir on the basis of the pressure in said wheel brake cylinder set by said pressure setting means when the gradual pressure increasing operation starts, and in response to the gradual pressure increasing time thereafter.

2. The anti-skid control system as claimed in claim 1, further comprising:

first pressure increase allowing means for controlling said actuating means so as to allow said hydraulic pressure generator to communicate with said wheel brake cylinder, when said reservoir fluid estimating means estimates the amount of brake fluid stored in said reservoir to be approximately zero.

3. The anti-skid control system as claimed in claim 2, further comprising:

wheel's side fluid estimating means for estimating the amount of brake fluid fed from said hydraulic pressure generator to a hydraulic circuit at the wheel's side including said wheel brake cylinder; and second pressure increase allowing means for controlling said actuating means so as to allow said hydraulic pressure generator to communicate with said wheel brake cylinder, when the amount of brake fluid estimated by said wheel's side fluid estimating means is smaller than the capacity of said reservoir.

4. The anti-skid control system as claimed in claim 3, wherein said wheel's side fluid estimating means includes output pressure detection means for detecting a braking pressure output from said hydraulic pressure generator, and wherein said wheel's side fluid estimating means is provided for estimating the amount of brake fluid fed to said hydraulic circuit at the wheel's side on the basis of the difference between the pressure output from said hydraulic pressure generator detected by said output pressure detection means and the pressure in said wheel brake cylinder set by said pressure setting means.

5. The anti-skid control system as claimed in claim 4, wherein said second pressure increase allowing means allows said hydraulic pressure generator to communicate with said wheel brake cylinder, provided that when the amount of brake fluid estimated by said wheel's side fluid estimating means is smaller than the capacity of said reservoir, and when more than a predetermined time has lapsed after the pressure decreasing operation ended, or when the estimated amount of brake fluid in said reservoir has become equal to or smaller than zero.

6. The anti-skid control system as claimed in claim 2, wherein said actuating means is controlled by said first pressure increase allowing means so as to gradually increase the pressure of brake fluid fed from said hydraulic pressure generator to said wheel brake cylinder.

7. The anti-skid control system as claimed in claim 1, wherein said pressure setting means includes vehicle deceleration detection means for detecting a vehicle deceleration, and means for estimating the pressure in said wheel brake cylinder on the basis of the vehicle deceleration to initially set or reset the pressure in said wheel brake cylinder on the basis of the estimated pressure.

8. The anti-skid control system as claimed in claim 7, wherein said vehicle deceleration detection means includes wheel speed detection means for detecting wheel speeds of said road wheels, and means for estimating an estimated vehicle speed on the basis of the wheel speeds of said road wheels and differentiating the estimated vehicle speed to provide the vehicle deceleration.

9. The anti-skid control system as claimed in claim 1, wherein said pressure setting means includes a pressure sensor for detecting the pressure in said wheel brake cylinder and providing a pressure signal corresponding thereto to initially set or reset the pressure in said wheel brake cylinder on the basis of the pressure signal.

10. The anti-skid control system as claimed in claim 1, wherein said actuating means includes:

a three-port two-position changeover valve having a first port connected to said hydraulic pressure generator, and a second port connected to an end of said return passage; and a two-port two-position changeover valve having a first port connected to a third port of said three-port two-position changeover valve, and a second port connected to said wheel brake cylinder;

wherein said three-port two-position changeover valve is selectively placed in one of a first operating position for communicating said two-port two-position changeover valve with said hydraulic pressure generator and blocking the communication with said return passage, and a second operating position for communicating said two-port two-position changeover valve with said return passage and blocking the communication with said hydraulic pressure generator, and wherein said two-port two-position changeover valve is selectively placed in one of a first operating position for communicating said wheel brake cylinder with said three-port two-position changeover valve, and a second operating position for blocking the communication between said wheel brake cylinder and said three-port two-position changeover valve.

\* \* \* \* \*